United States Patent
Kim et al.

(10) Patent No.: US 12,262,447 B2
(45) Date of Patent: Mar. 25, 2025

(54) METHOD AND APPARATUS FOR SUPPORTING EDGE COMPUTING SERVICE FOR ROAMING UE IN WIRELESS COMMUNICATION SYSTEM

(71) Applicant: Samsung Electronics Co., Ltd., Suwon-si (KR)

(72) Inventors: Hyesung Kim, Suwon-si (KR); Jicheol Lee, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 350 days.

(21) Appl. No.: 17/964,532

(22) Filed: Oct. 12, 2022

(65) Prior Publication Data

US 2023/0132454 A1 May 4, 2023

(30) Foreign Application Priority Data

Oct. 28, 2021 (KR) .................. 10-2021-0146051

(51) Int. Cl.
*H04W 8/12* (2009.01)
*H04M 15/00* (2006.01)
*H04W 8/06* (2009.01)

(52) U.S. Cl.
CPC ............ *H04W 8/12* (2013.01); *H04M 15/66* (2013.01); *H04W 8/06* (2013.01)

(58) Field of Classification Search
CPC ........... H04W 8/12; H04W 8/06; H04W 4/24; H04W 8/082; H04W 76/00; H04W 88/14;
(Continued)

(56) References Cited

U.S. PATENT DOCUMENTS 10,999,447 B2* 5/2021 Qiao ...................... H04W 28/24
11,115,801 B2* 9/2021 Hu .......................... H04W 8/12
(Continued)

FOREIGN PATENT DOCUMENTS

KR  10-2023-0013568 A   1/2023
WO     2018/167254 A1    9/2018

OTHER PUBLICATIONS

3rd Generation Partnership Project; Technical Specification Group Services and System Aspects; Policy and charging control architecture (Release 17), 3GPP TS 23.203 V17.2.0, Dec. 23, 2021, Valbonne, France.

(Continued)

*Primary Examiner* — Abdullahi Ahmed
(74) *Attorney, Agent, or Firm* — Jefferson IP Law, LLP

(57) ABSTRACT

A method of a visited session management function (V-SMF) supporting an edge computing (EC) service for a roaming user equipment (UE) in a wireless communication system is provided. The method includes receiving a first request message for protocol data unit (PDU) session establishment of the roaming UE from an access and mobility management function (AMF), the first request message including a first indication indicating supportability of session breakout (SBO) of a home routed (HR) roaming session in a visited network, and a session management policy indication for supporting the EC service through HR roaming, selecting a visited policy control function (V-PCF) providing an SBO policy for supporting the EC service for the HR roaming session according to the first request message, and transmitting a second request message requesting the EC service through the HR roaming session to the V-PCF, the second request message including an SBO requesting indication for the HR roaming session.

20 Claims, 14 Drawing Sheets

(58) Field of Classification Search
CPC ............ H04M 15/66; H04M 15/8038; H04M 15/8228; H04L 12/1407
See application file for complete search history.

(56) References Cited

U.S. PATENT DOCUMENTS

| | | | |
|---|---|---|---|
| 2018/0192348 A1* | 7/2018 | Ma | H04W 4/24 |
| 2020/0145538 A1* | 5/2020 | Qiao | H04M 15/85 |
| 2021/0185585 A1* | 6/2021 | Chen | H04W 8/08 |
| 2021/0360379 A1* | 11/2021 | Wu | H04W 8/14 |
| 2022/0256390 A1* | 8/2022 | Sun | H04W 36/0044 |
| 2024/0022469 A1* | 1/2024 | Hu | H04L 41/122 |
| 2024/0380848 A1* | 11/2024 | Wang | H04M 15/66 |

OTHER PUBLICATIONS

3GPP; TSG SA; Study on enhancement of support for Edge Computing in 5G Core network (5GC), Nov. 27, 2020.
3GPP TSG SA; System architecture for the 5G System (5GS); Stage 2, Sep. 24, 2021.
S2-2107292, New SID: Study on System Enabler for Service Function Chaining, Oct. 11, 2021.
3GPP; TSG SA; 5G System Enhancements for Edge Computing; Phase 2, Sep. 1, 2022.
S2-2205191, KI#1, New Sol: SM policy association for HR roaming session breakout, May 23, 2022.
International Search report dated Jan. 18, 2023, issued in International Patent Application No. PCT/KR2022/015354.

* cited by examiner

METHOD AND APPARATUS FOR SUPPORTING EDGE COMPUTING SERVICE FOR ROAMING UE IN WIRELESS COMMUNICATION SYSTEM

CROSS-REFERENCE TO RELATED APPLICATION(S)

This application is based on and claims priority under 35 U.S.C. § 119(a) of a Korean patent application number 10-2021-0146051, filed on Oct. 28, 2021, in the Korean Intellectual Property Office, the disclosure of which is incorporated by reference herein in its entirety.

BACKGROUND

1. Field

The disclosure relates to a wireless communication system. More particularly, the disclosure relates to a method and apparatus for configuring information related to an edge computing service for a roaming user equipment (UE) and a network in a wireless communication system.

2. Description of Related Art

In order to meet the demand for wireless data traffic soring since the 4th generation (4G) communication system came to the market, there are ongoing efforts to develop enhanced 5th generation (5G) communication systems or pre-5G communication systems. For the reasons, the 5G communication system or pre-5G communication system is called the beyond 4G network communication system or post long term evolution (LTE) system.

For higher data transmit rates, 5G communication systems are considered to be implemented on ultra-high frequency bands (millimeter wave (mmWave)), such as, e.g., 60 GHz. To mitigate pathloss on the ultra-high frequency band and increase the reach of radio waves, the following techniques are taken into account for the 5G communication system: beamforming, massive multi-input multi-output (MIMO), full dimensional MIMO (FD-MIMO), array antenna, analog beamforming, and large scale antenna.

Also being developed are various technologies for the 5G communication system to have an enhanced network, such as evolved or advanced small cell, cloud radio access network (cloud RAN), ultra-dense network, device-to-device (D2D) communication, wireless backhaul, moving network, cooperative communication, coordinated multi-point (CoMP), and reception interference cancellation.

There are also other various schemes under development for the 5G system including, e.g., hybrid frequency shift keying (FSK) and quadrature amplitude modulation (QAM) (FQAM) and sliding window superposition coding (SWSC), which are advanced coding modulation (ACM) schemes, and filter bank multi-carrier (FBMC), non-orthogonal multiple access (NOMA) and sparse code multiple access (SCMA), which are advanced access schemes.

The $3^{rd}$ generation partnership project (3GPP) responsible for the cellular mobile communication standards is working on standardization of a new core network structure called 5G core (5GC), for evolution from the legacy 4G LTE system to the 5G system.

Compared to the network core of legacy 4G, evolved packet core (EPC), the 5GC supports the following differentiated functions.

First, network slicing is introduced in the 5GC. As a requirement of 5G, the 5GC should support various user equipment (UE) types and services: e.g., enhanced mobile broadband (eMBB), ultra reliable low latency communications (URLLC), and massive machine type communications (mMTC). Each of these UE types/services has different requirements for the core network. For example, the eMBB service requires a high data rate, and the URLLC service requires high stability and low latency. Network slicing has been proposed to satisfy these various service requirements.

Network slicing is a technique of creating multiple logical networks by virtualizing one physical network, and each network slice instance (NSI) may have different characteristics. Accordingly, various service requirements may be satisfied by providing network functions (NFs) suitable for the characteristics of each NSI. Various 5G services may be efficiently supported by allocating an NSI suitable for the characteristics of a required service to each UE.

Secondly, the 5GC may readily support a network virtualization paradigm by separating a mobility management function from a session management function. In legacy 4G LTE, all UEs are able to receive services from a network by exchanging signaling with a single core device called a mobility management entity (MME) responsible for registration, authentication, mobility management, and session management functions. However, in view of a drastically increasing number of UEs and subdivided features of mobility and traffic/sessions that need to be supported according to UE types in 5G, support of all functions in a single device, such as the MME decreases the scalability of adding an entity on a required function basis. Therefore, various functions are under development based on a structure that separates the mobility management function from the session management function in order to improve scalability in terms of function/implementation complexity and signaling load of a core device in charge of a control plane.

The above information is presented as background information only to assist with an understanding of the disclosure. No determination has been made, and no assertion is made, as to whether any of the above might be applicable as prior art with regard to the disclosure.

SUMMARY

A wireless communication system, such as 5th generation (5G) may support a roaming service for a home routed (HR) user equipment (UE) (hereinafter, referred to as an HR roaming service). In an HR case, data traffic in a visited network may be routed to a data network through a home network. To apply an edge computing service to a roaming UE, an HR session may be broken out to a local data network in which an edge computing server of the visited network is installed. There may be a need for a specific procedure of breaking out an HR session in a visited network and applying a policy (e.g., quality of service (QoS) and usage monitoring) to the broken-out session. In an existing HR roaming scenario, a session management function (SMF) (e.g., visited (V)-SMF) and a policy control function (PCF) (e.g., V-PCF) of a visited network may not perform session management (SM) policy association in a session creation process.

Aspects of the disclosure are to address at least the above-mentioned problems and/or disadvantages and to provide at least the advantages described below. Accordingly, an aspect of the disclosure is to provide a method and apparatus for configuring and applying a policy for a session of a roaming UE.

Another aspect of the disclosure is to provide a method and apparatus for supporting session breakout for an HR session and configuring policies, such as QoS and usage monitoring for the HR session.

Another aspect of the disclosure is to provide a method and apparatus for creating an HR SM policy by a policy control function (PCF) in a visited network or a home network.

Another aspect of the disclosure is to provide a method and apparatus for identifying a UE using an edge computing service, determining SM policy association related to HR session breakout in a visited network, and providing policy-related information to an SMF of the visited network through the SM policy association related to the HR session breakout.

Additional aspects will be set forth in part in the description which follows and, in part, will be apparent from the description, or may be learned by practice of the presented embodiments.

In accordance with an aspect of the disclosure, a method performed by a V-SMF supporting an edge computing service for a roaming UE in a wireless communication system is provided. The method includes receiving a first request message for protocol data unit (PDU) session establishment of the roaming UE from an access and mobility management function (AMF), wherein the first request message includes a first indication indicating that session breakout (SBO) of an HR roaming session in a visited network is supportable, and a session management policy indication for supporting the edge computing service through HR roaming, selecting a V-PCF providing an SBO policy for supporting the edge computing service for the HR roaming session according to the first request message, and transmitting a second request message requesting the edge computing service through the HR roaming session to the V-PCF.

The second request message includes an indication requesting an SBO policy for the HR roaming session. The method further includes receiving a response message including the SBO policy for the HR roaming session from the V-PCF, and configuring user plane (UP) paths in a plurality of user plane functions (UPFs) related to the HR roaming session based on the SBO policy.

The method further includes transmitting a third request message including session management policy information applied for SBO of the HR roaming session to a home SMF (H-SMF) of the roaming UE. The third request message includes a result of configuring the SBO policy, policy information corresponding to the plurality of UPFs, and UPF information indicating the plurality of UPFs. The method further includes transmitting a message including a domain name service (DNS) message handling rule and a home DNS server address for the HR roaming session to a visited edge application server discovery function (V-EASDF) for the edge computing service of the roaming UE. The method further includes transmitting a PDU session creation result for the HR roaming session and the home DNS server address to the roaming UE through the AMF.

In accordance with another aspect of the disclosure, a method performed by a V-PCF supporting an edge computing service for a roaming UE in a wireless communication system is provided. The method includes receiving a first request message requesting the edge computing service through an HR roaming session of the roaming UE from a V-SMF, the first request message including an indication requesting an SBO policy for the HR roaming session, in response to the indication indicating visited network controlled policy decision, determining to create the SBO policy in a visited network, and transmitting a response message including the SBO policy created by the V-PCT to the V-SMF.

The method further includes, in response to the indication indicating home network controlled policy decision, determining to create the SBO policy in conjunction with a home PCF (H-PCF). The method further includes transmitting a second request message requesting creation of a session management policy for the HR roaming session to the H-PCF. The second request message includes an indication requesting an SBO policy for the HR roaming session and information about a V-SMF managing the HR roaming session. The method further includes receiving a session management policy including the SBO policy for the HR roaming session from the H-PCF. The method further includes transmitting the session management policy to the V-SMF.

In accordance with another aspect of the disclosure, a V-SMF supporting an edge computing service for a roaming UE in a wireless communication system is provided. The V-SMF includes a communication interface, and at least one processor coupled to the communication interface. The at least one processor may be configured to receive a first request message for PDU session establishment of the roaming UE from an AMF, the first request message including a first indication indicating that SBO of an HR roaming session in a visited network is supportable, and a session management policy indication for supporting the edge computing service through HR roaming, select a V-PCF providing an SBO policy for supporting the edge computing service for the HR roaming session according to the first request message, and transmit a second request message requesting the edge computing service through the HR roaming session to the V-PCF, the second request message including an indication requesting an SBO policy for the HR roaming session.

The at least one processor may be configured to receive a response message including the SBO policy for the HR roaming session from the V-PCF. The at least one processor may be configured to configure user plane (UP) paths in a plurality of UPFs related to the HR roaming session based on the SBO policy. The at least one processor may be configured to transmit a third request message including session management policy information applied for SBO of the HR roaming session to an H-SMF of the roaming UE. The third request message includes a result of configuring the SBO policy, policy information corresponding to the plurality of UPFs, and UPF information indicating the plurality of UPFs. The at least one processor may be configured to transmit a message including a DNS message handling rule and a home DNS server address for the HR roaming session to a V-EASDF for the edge computing service of the roaming UE. The at least one processor may be configured to transmit a PDU session creation result for the HR roaming session and the home DNS server address to the roaming UE through the AMF.

In accordance with another aspect of the disclosure, a V-PCF supporting an edge computing service for a roaming UE in a wireless communication system is provided. The V-PCF includes a communication interface and at least one processor coupled to the communication interface. The at least one processor may be configured to receive a first request message requesting the edge computing service through an HR roaming session of the roaming UE from a visited session management function (V-SMF), wherein the first request message includes an indication requesting an SBO policy for the HR roaming session, in response to the indication indicating visited network controlled policy decision, determine to create the SBO policy in a visited network, and transmit a response message including the SBO policy created by the V-PCF to the V-SMF.

The at least one processor may be configured to, in response to the indication indicating home network controlled policy decision, determine to create the SBO policy in conjunction with an H-PCF, and transmit a second request message requesting creation of a session management policy for the HR roaming session to the H-PCF. The second request message includes an indication requesting an SBO policy for the HR roaming session and information about a V-SMF managing the HR roaming session. The at least one processor may be configured to receive a session management policy including the SBO policy for the HR roaming session from the H-PCF. The at least one processor may be configured to transmit the session management policy to the V-SMF.

Embodiments of the disclosure may configure and apply an SM policy required to provide an edge computing service to a roaming UE in an HR scenario. Embodiments of the disclosure may support a UE to appropriately and effectively use an edge computing service in a visited network.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
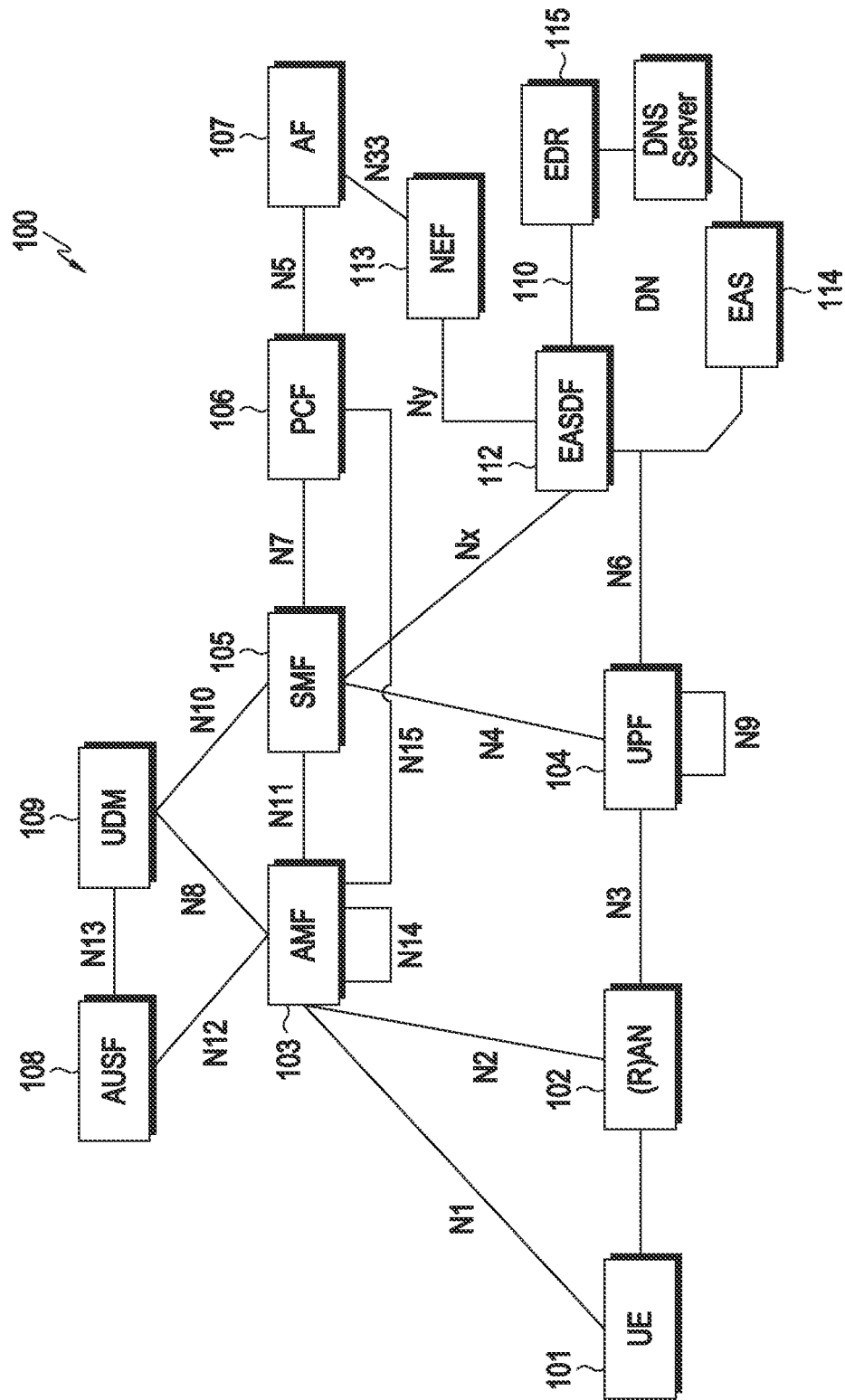
FIG. 1 is a diagram illustrating a system structure of a 5' generation (5G) system supporting edge computing according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Although the terms as described later are defined in consideration of functions in the disclosure, the terms may be changed according to the intention of a user or an operator, or customs. Therefore, the definitions should be made, not simply by the actual terms used but by the meanings of each term lying within. For the same reason, some components are exaggerated, omitted, or schematically illustrated in the drawings. The drawn size of each component does not exactly reflect its real size. In each drawing, the same reference numerals are assigned to the same or corresponding components. The advantages and features of the disclosure, and a method of achieving them will become apparent from reference to embodiments described below in conjunction with the attached drawings. However, the disclosure may be implemented in various manners, not limited to the embodiments set forth herein. Rather, these embodiments are provided such that the disclosure is complete and thorough and its scope is fully conveyed to those skilled in the art, and the disclosure is only defined by the appended claims. The same reference numerals denote the same components throughout the specification. A detailed description of a generally known function or structure of the disclosure will be avoided lest it should obscure the subject matter of the disclosure. The terms as described later are defined in consideration of functions in the disclosure, and may be changed according to the intention of a user or an operator, or customs. Therefore, the definitions should be made, not simply by the actual terms used but by the meanings of each term lying within.

Terms indicating a network entity and objects of an edge computing system, terms indicating messages, terms indicating identification information, and so on as used in the disclosure are illustratively provided, for convenience of description. Accordingly, embodiments of the disclosure are not limited to the terms described below, and other terms having equivalent technical meanings may be used.

While for convenience of description, the disclosure may use terms and names defined in the 5th generation (5G) system standards, the disclosure is not limited by the terms and names and may be equally applied to systems conforming to other standards.

For the 5G network technology and the edge computing technology described in the drawings and description of the disclosure, a standard specification (e.g., TS 23.558) defined by the international telecommunication union (ITU) or 3rd generation partnership project (3GPP) is referred to. Each of components included in a later-described network environment may be a physical entity unit or a software or module unit capable of performing an individual function.

According to an embodiment of the disclosure, an electronic device may refer to various devices used by a user. For example, the electronic device may be a terminal, a user equipment (UE), a mobile station, a subscriber station, a remote terminal, a wireless terminal, or a user device. For convenience, embodiments of the disclosure will be described below in the context of a UE as an electronic device.

According to an embodiment of the disclosure, an access network (AN) may provide a channel for wireless communication with an electronic device. The AN may be a radio access network (RAN), a base station (BS), an evolved Node B (eNB or eNodeB), a 5G node, a transmission/reception point (TRP), or a 5G Node B (5GNB). According to an embodiment of the disclosure, a core network (CN) may manage at least one of subscriber information about a UE, mobility, access authorization, data packet traffic (traffic), or a charging policy.

In an embodiment of the disclosure, the CN may include at least one network node of a user plane function (UPF), an access & mobility management function (AMF), a session management function (SMF), a unified data management (UDM), or a policy control function (PCF) node, and for the functions and operations of nodes (or entities) included in the CN, a standard specification (e.g., TS 23.501) defined by the 3GPP may be referred to.

Edge computing is a technology proposed to allow services of an operator and/or a third party to be hosted close to an access point, such as a BS, reduce end-to-end latency and load in a network, and thus enable efficient service provision. In this edge computing technology, a data processing time may be shortened by processing data generated at UEs in real time at a short distance from a site where the data is generated without transmitting the data to a central cloud network (hereinafter, referred to as a "central cloud"). For example, the edge computing technology may be applied to a technical field, such as an autonomous vehicle requiring rapid processing in various situations that may occur during driving.

Edge computing is a concept of a network architecture that enables cloud computing functions and service environments, and a network for edge computing may be deployed close to a UE. Edge computing may offer benefits, such as reduced latency, an increased bandwidth, reduced backhaul traffic, and prospects for new services, compared to a cloud environment. A CN beyond 5G or 6th generation (6G) proposed by the 3GPP may expose network information and functions to edge computing applications (hereinafter, referred to as edge applications).

According to an embodiment of the disclosure, in mobile edge computing, a UE may establish a data connection with an edge data network (EDN) close to its location to use a low-latency or broadband service, and access an edge application server (EAS) operating in an edge hosing environment or an edge computing platform operated by an edge enabler server (EES) of the EDN, to use a data service.

FIG. 1 is a diagram illustrating a system structure of a $5^{th}$ generation (5G) system supporting edge computing according to an embodiment of the disclosure. The illustrated structure may include various network functions (NFs) depending on system implementation.

Referring to FIG. 1, the network structure of a 5G system 100 may include various network entities. For example, the 5G system 100 may include at least one of an authentication server function (AUSF) 108, a (core) AMF 103, an SMF 105, a PCF 106, an application function (AF) 107, a UDM 109, a data network (DN) 110, a network exposure function (NEF) 113, an edge application service domain repository (EDR) 115, an EAS 114, an EAS discovery function (EASDF) 112, a UPF 104, a radio access network (RAN) 102, or a UE 101.

In an embodiment of the disclosure, the NFs may support the following functions.

The AUSF 108 may process and store data for authentication of the UE 101.

The AMF 103 may provide functionalities for access and mobility management on a UE basis, and one UE may be basically coupled to one AMF. For example, the AMF 103 may support inter-CN node signalling for mobility between 3GPP access networks, termination of a RAN control plane (CP) interface (e.g., N2 interface), termination (N1) of non-access stratum (NAS) signalling, NAS ciphering and integrity protection, access stratum (AS) security control, registration management (registration area management), connection management, idle-mode UE reachability (including control and execution of paging retransmission), mobility management control (subscription and policy), support of intra-system mobility and inter-system mobility, support of network slicing, SMF selection, lawful intercept (for AMF events and interfaces to an L1 system), delivery of session management (SM) messages between the UE 101 and the SMF 105, transparent proxy for SM message routing, access authentication, access authorization including roaming authority check, security anchor function (SAF), and/or security context management (SCM). Some or all of the functions of the AMF 103 may be supported in a single instance of an AMF. In a home-routed (HR) scenario (or referred to as a roaming scenario), a visited AMF (V-AMF) may refer to an AMF of a visited network of a subscriber (e.g., the UE 101), and a home AMF (H-AMF) may refer to an AMF of a home network of the subscriber.

The DN 110 may mean, for example, an operator service, Internet access, or a third party service. The DN 110 may transmit a downlink (DL) protocol data unit (PDU) to the UPF 104, or receive a PDU transmitted by the UE 101 from the UPF 104.

The PCF 106 may receive information about a packet flow from an application server (e.g., the AF 107), and provide a functionality of determining a policy, such as mobility management or SM. In an embodiment of the disclosure, the PCF 106 may support functions, such as support of a unified policy framework for controlling a network behaviour, provision of policy rules to enable control plane function(s) (e.g., the AMF 103 or the SMF 105) to enforce policy rules, or implementation of a front end for accessing related subscription information for policy making in a user data repository (UDR).

The SMF 105 provides a session management function, and when the UE 101 has a plurality of sessions, each session may be managed by a different SMF. In an embodiment of the disclosure, the SMF 105 may support functionalities, such as session management (e.g., session establishment, modification, and release, including maintaining a tunnel between the UPF 104 and the RAN 102), UE Internet protocol (IP) address assignment and management (optionally including authentication), selection and control of user plane (UP) functions, traffic steering configuration for routing traffic to an appropriate destinations at the UPF 104, termination of interfaces toward PCFs, execution of a control part of policy and quality of service (QoS), lawful intercept (for SM events and interfaces to an LI system), termination of an SM part of NAS messages, DL data notification, AN-specific SM information initiator (transmitted via the SMF 103 over N2 to the RAN 102), determination of SSC mode of a session, or roaming Some or all of the functionalities of the SMF 105 may be supported in a single instance of an SMF.

The UDM 109 may store subscription data of a user (e.g., the UE 101), and/or policy data. The UDM 109 may include two parts, that is, an application front end (FE) (not shown) and a UDR (not shown).

The FE may include a UDM FE in charge of location management, subscription management, or credentials, and a PCF in charge of policy control. The UDR may store data required for functions provided by the UDM FE, and a policy profile required by the PCF. Data stored in the UDR may include policy data and user subscription data including a subscription identifier (ID), a security credential, access and mobility-related subscription data, and/or session-related subscription data. The UDM FE may support functionalities, such as accessing subscription information stored in the UDR, authentication credential processing, user identification handling, access authentication, registration/mobility management, subscription management, or session management.

The UPF 104 may forward a DL PDU received from the DN 110 to the UE 101 via the RAN 102, and forward an uplink (UL) PDCU received from the UE 101 to the DN 110 via the RAN 102. In an embodiment of the disclosure, the UPF 104 may support functionalities, such as an anchor point for intra-/inter-radio access technology (RAT) mobility (e.g., a PDU session anchor (PSA)), an external PDU session point of interconnect to a data network, packet routing & forwarding, packet inspection & user-plane part of policy rule enforcement, lawful intercept, traffic usage reporting, a UL classifier for supporting routing of a traffic flow to a data network, a branching point (BP) for supporting a multi-homed PDU session, QoS handling for the user plane (e.g., packet filtering, gating, and UL/DL rate enforcement), UL traffic verification (service data flow (SDF) to QoS flow mapping), transport level packet marking in UL and DL, or DL packet buffering & DL data notification triggering. Some or all of the functionalities of the UPF 104 may be supported in a single instance of a UPF.

The AF 107 may interact with a 3GPP CN in order to provide services (e.g., to support the following: application influence on traffic routing, accessing network capability exposure, and interacting with the policy framework for policy control).

The RAN 102 may generically refer to a radio access network supporting at least one of an evolved version of the 4G RAT, evolved UMTS terrestrial radio access (E-UTRA) or a new RAT (new radio (NR)) (e.g., gNB).

The gNB may support functionalities, such as functions for radio resource management (radio bearer control, radio admission control, connection mobility control, dynamic allocation of resources to UEs in both UL and DL (i.e., scheduling)), IP header compression, encryption and integrity protection of a user data stream, selection of an AMF at UE attachment when no routing to an AMF is determined from information provided by the UE, routing of user-plane data towards UPF(s), routing of control-plane information towards an AMF, connection setup and release, scheduling and transmission of paging messages (originated from the AMF), scheduling and transmission of system broadcast information (originated from an operating and maintenance (OAM)), measurement and measurement reporting configuration for mobility and scheduling, transport level packet marking in UL, SM, support of network slicing, QoS flow management and mapping to data radio bearers, support of UEs in inactive mode, distribution function for NAS messages, radio access network sharing, dual connectivity, or tight interworking between NR and E-UTRA.

The UE 101 may refer to a user device. The UE may be referred to as a terminal, a mobile equipment (ME), a mobile station (MS), and so on. For example, the UE may be a portable device, such as a laptop computer, a mobile phone, a personal digital assistant (PDA), a smartphone, a multimedia device, or the like, or may be a non-portable device, such as a personal computer (PC) or an in-vehicle device.

The NEF 111 may provide means to securely expose services and capabilities provided by 3GPP network functions, for example, including 3rd party, internal exposure/re-exposure, application functions, and/or edge computing. The NEF 111 may receive information from other NF(s) (based on exposed capability(es) of other NF(s)). The NEF 111 may store the received information as structured data using a standardized interface to a UDR. The stored information may be "re-exposed" to other NF(s) and AF(s) by the NEF 111, or used for other purposes, such as analytics.

The EASDF 112 may add the address of a domain name service (DNS) server to which a DNS Query of the UE 101 is to be forwarded, and an extension mechanisms for DNS (EDNS) client subnet (ECS) option which may be expressed as an IP subnet address to be added when the DNS Query of the UE 101 is forwarded, for each fully qualified domain name (FQDN) basis. The EASDF 112 may receive EAS domain configuration information from the EDR 113, and process a DNS Query message received from a UE (e.g., the UE 101) according to the received information. The EASDF 112 may receive a UE IP address, location information about the UE 101 in the 3GPP, DNS message processing rules, and DNS message reporting rules from the SMF 105, process the DNS Query message received from the UE 101 and a DNS Response message received from a DNS server, and transmit information within the DNS messages and statistical information obtained by processing the information to the SMF 105.

While FIG. 1 illustrates a reference model for a case in which the UE 101 accesses one DN 110 by one PDU session, embodiments of the disclosure are not limited thereto.

The UE 101 may simultaneously access two data networks (e.g., a local DN and a central DN) using multiple PDU sessions. In this case, two SMFs may be selected for the different PDU sessions. In an embodiment of the disclosure, each SMF may have the capability of controlling both a local UPF and a central UPF within a PDU session.

The UE 101 may simultaneously access two data networks (e.g., a local DN and a central DN) provided in a single PDU session.

In the 3GPP system, a conceptual link connecting between NFs in the 5G system is defined as a reference point. For example, reference point(s) included in the 5G system 100 of FIG. 1 are given as follows.

N1: reference point between the UE 101 and the AMF 103
N2: reference point between the RAN 102 and the AMF 103
N3: reference point between the RAN 102 and the UPF 104
N4: reference point between the SMF 105 and the UPF 104
N5: reference point between the PCF 106 and the AF 107
N6: reference point between the UPF 104 and the DN 110
N7: reference point between the SMF 105 and the PCF 106
N8: reference point between the UDM 109 and the AMF 103
N9: reference point between two core UPFs 104
N10: reference point between the UDM 109 and the SMF 105
N11: reference point between the AMF 103 and the SMF 105
N12: reference point between the AMF 103 and the AUSF 108
N13: reference point between the UDM 109 and the AUSF 108
N14: reference point between two AMFs 103
N15: reference point between the PCF and the AMF in a non-roaming scenario, and reference point between the PCF and the AMF in a visited network in a roaming scenario
Nx: reference point between the EASDF 112 and another NF (e.g., the SMF 105)

Figure 2:
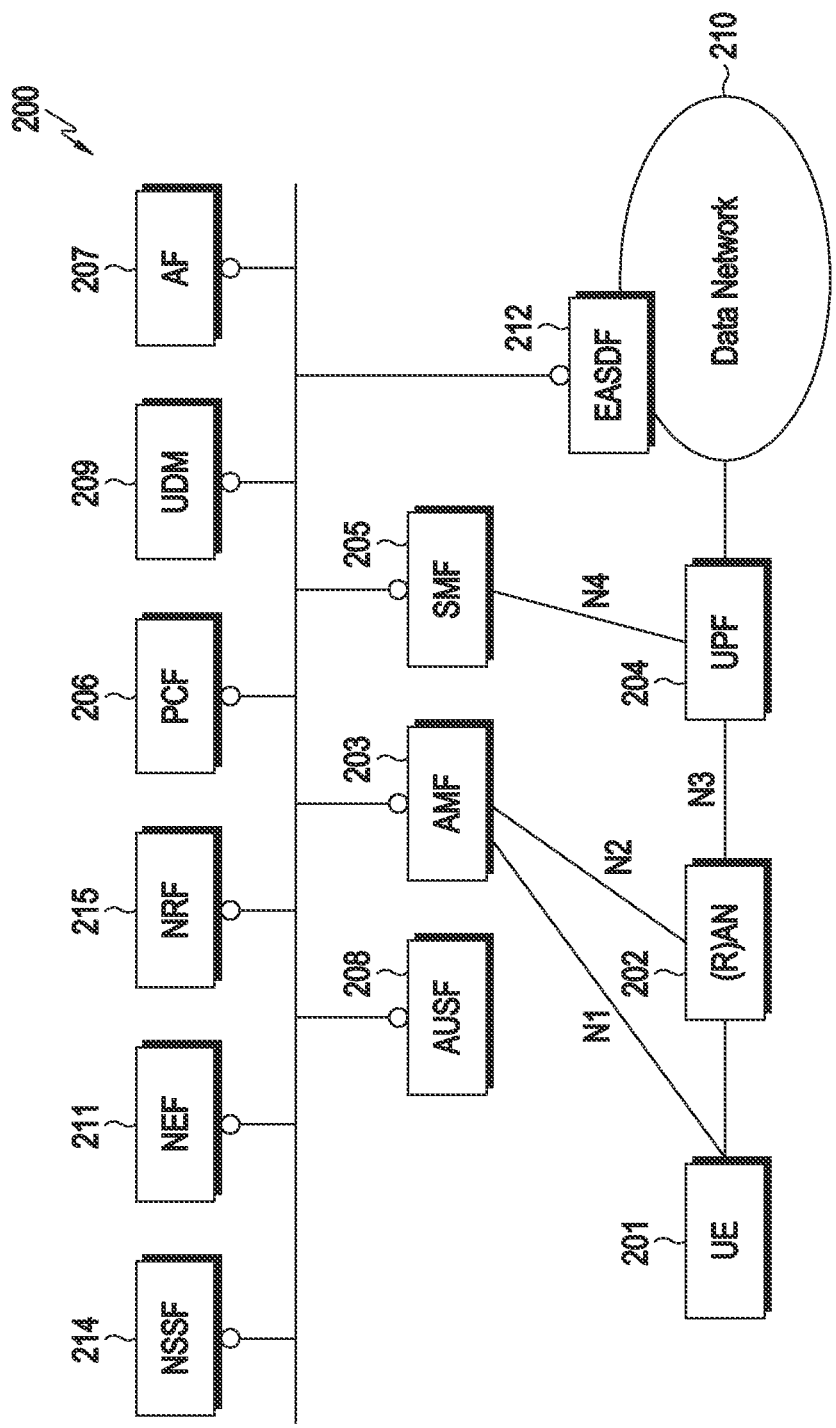
FIG. 2 is a diagram illustrating a network environment structure of a 5G system according to an embodiment of the disclosure.

FIG. 2 is a diagram illustrating a network environment structure of a 5G system according to an embodiment of the disclosure.

Referring to FIG. 2, a 5G system 200 may include at least one of a UE 201, a RAN 202, an AMF 203, a UPF 204, an SMF 205, a PCF 206, an AF 207, an AUSF 208, a UDM 209, a DN 210, an NEF 211, an EASDF 212, an EDR 213, a network slicing selection function (NSSF) 214, or an network repository function (NRF) 215. The UE 201, the RAN 202, the AMF 203, the UPF 204, the SMF 205, the PCF 206, the AF 207, the AUSF 208, the UDM 209, the DN 210, the NEF 211, the EASDF 212, and the EDR 213 of FIG. 2 may perform the same functionalities as the UE 101, the RAN 102, the AMF 103, the UPF 104, the SMF 105, the PCF 106, the AF 107, the AUSF 108, the UDM 109, the DN 110, the NEF 111, the EASDF 112, and the EDR 113 of FIG. 1.

The NSSF 214 may select a set of network slice instances serving UE 201. The NSSF 214 may determine allowed network slice selection assistance information (an allowed NSSAI) and, if necessary, map subscribed single-network slice selection assistance information (subscribed S-NSSAIs). The NSSF 214 may determine a configured NSSAI and, if necessary, map subscribed S-NSSAIs. The NSSF 214 may determine a set of AMFs 203 used to service the UE 201, or a list of candidate AMFs 203 by inquiring the NRF 215 according to a configuration.

The NRF 215 may support a service discovery function. The NRF 215 may receive an NF discovery request from an NF instance, and provide information about a discovered NF instance to the NF instance. The NRF 215 may maintain available NF instances and services supported by the NF instances.

Figure 3:
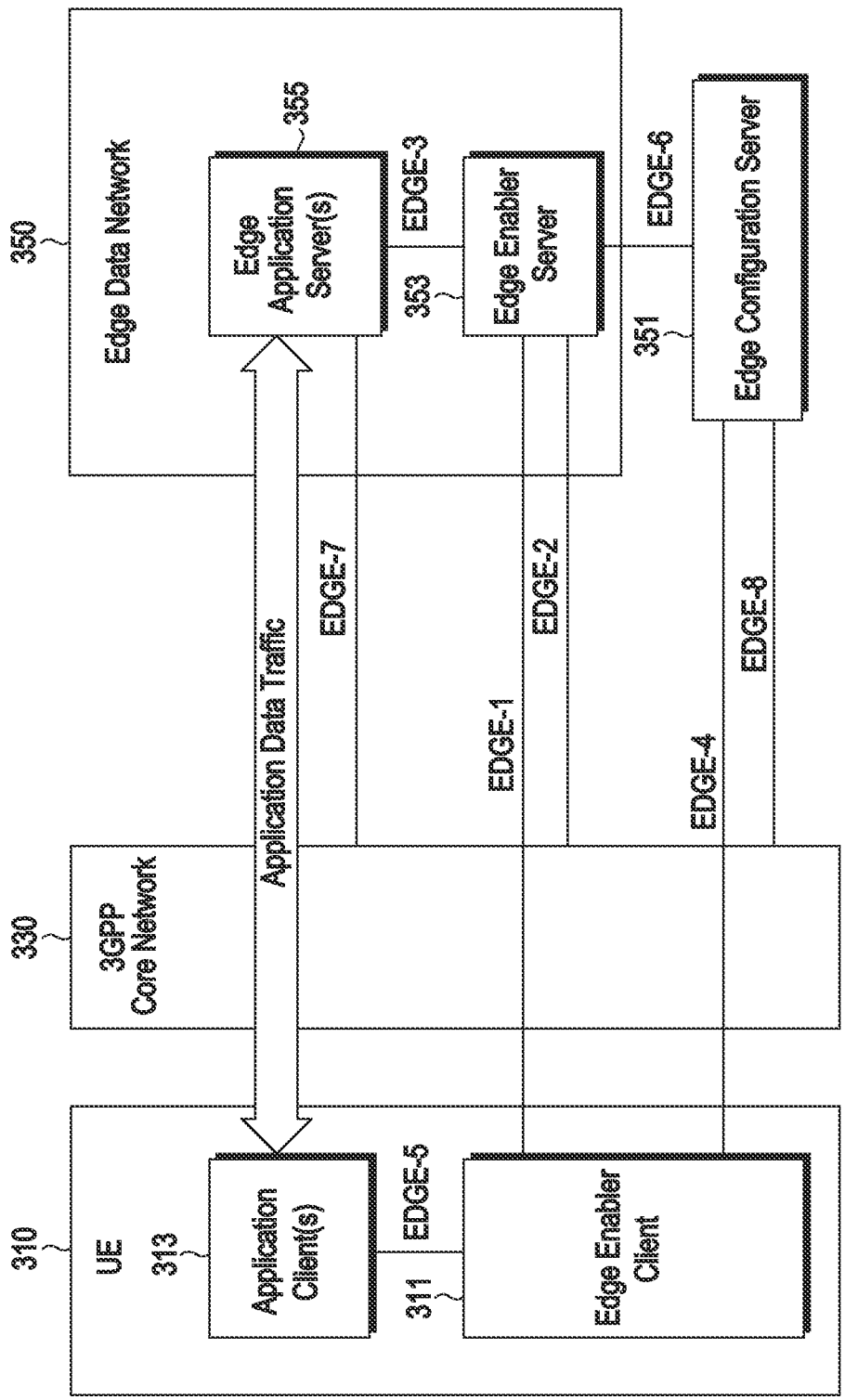
FIG. 3 is a diagram illustrating a configuration of an edge computing system according to an embodiment of the disclosure.

FIG. 3 is a diagram illustrating a configuration of an edge computing system according to an embodiment of the disclosure.

Referring to FIG. 3, an EDN 350 may include an EAS 355 and an EES 353. An edge configuration server (ECS) 351 may provide configuration information related to the EDN 350. The EAS 355, the EES 353, and the ECS 351 may interact with a CN 330 (e.g., which may include the NFs of FIG. 1 or FIG. 2) to provide an edge computing service to a UE 310. The UE 310 may include an application client (AC) 313 and an edge enabler client (EEC) 311. While not shown, the UE 310 further includes an edge configuration client (ECC).

With reference to FIG. 3, the functionality of each entity will be described. The EES 353 may provide supported functions required for the EAS 355 and the EEC 311. For example, the EES 353 may provide configuration information to the EAS 355 to enable exchange (transmission and reception) of application data traffic, and provide information related to the EAS 355 to the EEC 311. The EEC 311 may provide a supported function required for the AC 313. For example, the EEC 311 may detect configuration information, provide the configuration information to the AC 313 to enable exchange of application data traffic with the EAS 355, and detect the EAS 355 available in the EDN 350.

The ECS 351 may provide a supported function required for the EEC 311 to connect to the EES 353. In an embodiment of the disclosure, the ECS 351 may provide service area information or network address information (e.g., a uniform resource identifier (URI)) for the EEC 311 to connect to the EES 353. The ECS 351 may be deployed in a mobile network operator (MNO) domain of a communication operator or a third party domain of a service provider.

The AC 313 may be installed in the UE 310 to perform a client function, and may support transmission and reception of application data traffic between the UE 310 and the EAS 355. The EAS 355 may perform a server function for data traffic transmission and reception in the EDN 350. While a single EAS 355, a single EES 353, and a single ECS 351 are illustrated in FIG. 1, for convenience, a plurality of EASs 355, a plurality of EESs 353, and a plurality of ECSs 351 may exist.

Referring to FIG. 3, EDGE-1 to EGGE-8 mean network interfaces (i.e., reference points) between entities, and are described in Table 1 below. The description of EDGE-1 to EGGE-8 is not limited to Table 1 below.

TABLE 1

| Reference Points | Description |
| --- | --- |
| EDGE-1 | EDGE-1 reference point enables interactions between the Edge Enabler Server and the |

TABLE 1-continued

| Reference Points | Description |
| --- | --- |
| | Edge Enabler Client. It supports:<br>a) registration and de-registration of the Edge Enabler Client to the Edge Enabler server;<br>b) retrieval and provisioning of Edge Application Server configuration information; and<br>c) discovery of Edge Application Servers available in the Edge Data Network. |
| EDGE-2 | Edge-2 reference point enables interactions between the Edge Enabler Server and the 3GPP Core Network. It supports access to 3GPP Core Network functions and APIs for retrieval of network capability information. |
| EDGE-3 | EDGE-3 reference point enables interactions between the Edge Enabler Server and the Edge Application Servers. It support:<br>a) registration of Edge Application Servers with availability information (e.g. time constraints, location constraints);<br>b) de-registration of Edge Application Servers from the Edge Enabler Server; and<br>c) providing access to network capability information (e.g. location information). |
| EDGE-4 | EDGE-4 reference point enables interactions between the Edge Configuration Server and the Edge Enabler Client. It supports provisioning of Edge configuration information to the Edge Enabler Client. |
| EDGE-5 | EDGE-5 reference point enables interactions between Application Client(s) and the Edge Enabler Client. |
| EDGE-6 | EDGE-6 reference point enables interactions between the Edge Configuration Server and the Edge Enabler Server. It supports registration of Edge Enabler Server information to the Edge Enabler Network Configuration Server. |
| EDGE-7 | EDGE-7 reference point enables interactions between the Edge Application Server and the 3GPP Core Network. It supports access to 3GPP Core Network functions and APIs for retrieval of network capability information. |
| EDGE-8 | EDGE-8 reference point enables interactions between the Edge Configuration Server and the 3GPP Core network. |

Figure 4:
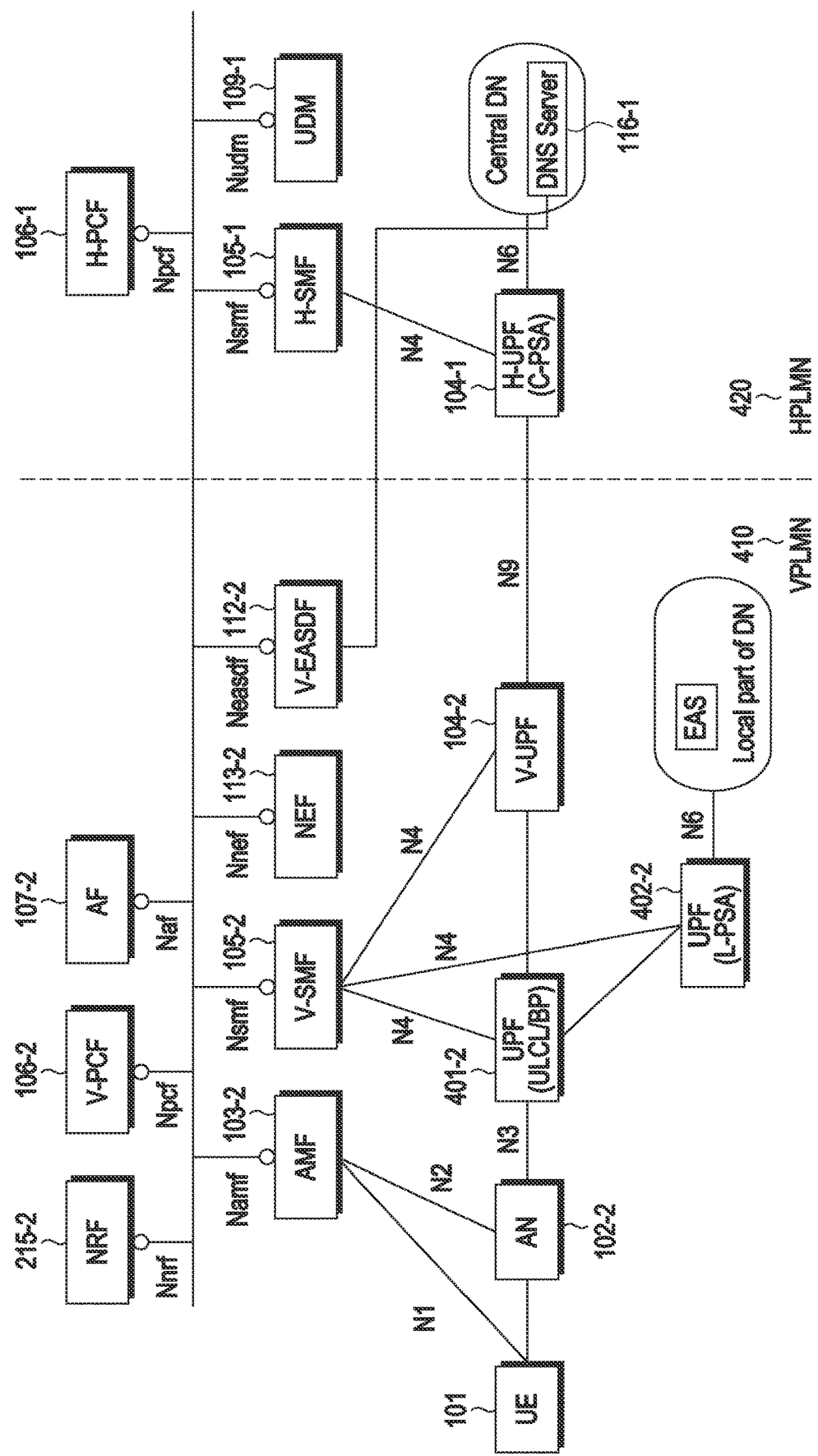
FIG. 4 is a diagram illustrating a 5G system structure for accessing an edge application server (EAS) of an edge computing service operated in a visited network in a home-routed (HR) roaming scenario according to an embodiment of the disclosure.

FIG. 4 is a diagram illustrating a 5G system structure for accessing an edge application server (EAS) of an edge computing service operated in a visited network in an HR roaming scenario according to an embodiment of the disclosure.

Referring to FIG. 4, a visited network 410 that may be identified as a visited public land mobile network (VPLMN) may include at least one of an AMF 103-2, a visited PCF (V-PCF) 106-2, a visited SMF (V-SMF) 105-2, a visited UPF (V-UPF) 104-2, a visited EASDF (V-EASDF) 112-2, or a visited DNS server (not shown).

The AMF 103-2 may reside in the visited network 410. In an embodiment of the disclosure, the AMF 103-2 may receive and store a visited session breakout (SBO) allowed indication from the UDM 109-1 during a registration procedure of the UE 101. The AMF 103-2 may identify a request for data network name/single-network slice selection assistance information (DNN/S-NSSAI) transmitted by the UE 101 in a PDU session creation procedure, and transmit the visited SBO allowed indication to the V-SMF 105-2. In an embodiment of the disclosure, the AMF 103 may transmit an address and/or ID of a home SMF (H-SMF) 105-1 along with a request for an HR session.

The V-PCF 106-2 may be a PCF of the visited network 410. The V-PCF 106-2 may receive a report of an AF request received from an AF 107-2 through an NEF 113-2 of the visited network 410 through a UDR (not shown), receive an AF influence traffic routing policy, and the V-SMF 105-2 may determine an SBO policy based on the AF influence traffic routing policy.

In an embodiment of the disclosure, AF Traffic Influence from the AF 107-2 of the visited network 410 may be delivered to the V-SMF 105-2 in the following path.

Visited AF (V-AF) 107-2→ visited NEF (V-NEF) 113-2→ visited UDR (V-UDR)→ V-PCF 106-2→ V-SMF 105-2

The V-SMF 105-2 may perform tunnel management for a home UPF (H-UPF) 104-1 through the V-UPF 104-2. The V-SMF 105-2 may determine SBO (a UL classifier (ULCL)/BP) in the visited network 410, and manage a UP session for a local PDU session anchor (L-PSA) UPF 402-2, a UPF 401-2, and the V-UPF 104-2 via N4. The V-SMF 105-2 may notify the H-SMF 105-1 that an addition/change/deletion event for a local UPF (e.g., the H-UPF) has been performed by transmitting a visited network session breakout (V-SBO) indication.

The V-SMF 105-2 may manage a session of the UE 101 in the visited network 410. When the UE 101 requests PDU session creation, the V-SMF 105-2 may receive a PDU session creation request from the AMF 103-2. The V-SMF 105-2 may receive a request including V-SBO and the ID/address of the H-SMF 105-1 from the AMF 103-2. When the V-SMF 105-2 is capable of receiving a V-SBO allowed indication from the AMF 103-2, the session is an HR session, and the V-SMF 105-2 has received the ID/IP address of the H-SMF 105-1 from the AMF 103-2, the V-SMF 105-2 may transmit an HR session creation request to the H-SMF 105-1. An indication requesting provisioning of V-SBO and/or an indication indicating that a V-SBO function is supported may be transmitted in the HR session creation request to the H-SMF 105-1. The V-SMF 105-2 may transmit the address of the V-EASDF 112-1 (the address of a visited DNS server (V-DNS server)) to the H-SMF 105-1. The V-SMF 105-2 may notify the H-SMF 105-1 of a routing rule for a local data network (LDN).

In an embodiment of the disclosure, the V-SMF 105-2 may determine addition/change/deletion of a ULCL/BP UPF (e.g., the UPF 401-2) and an L-PSA UPF (e.g., the UPF 402-2)). When the V-SMF 105-2 determines to add the ULCL/BP UPF 401-2, a network address of the LDN to be forwarded to the L-PSA UPF 402-2 may be reported to the H-SMF 105-1. The H-SMF 105-1 in a home network 420 identified as a home PLMN is responsible for packet forwarding of the HR session.

The V-UPF 104-2 may act as an anchor within the visited network 410, and perform DL data packet buffering for the UE 101 in an idle state and packet forwarding to the H-UPF 104-1 via an N9 tunnel. The V-UPF 104-2 may support the functions of the ULCL/BP UPF 401-2 or the L-PSA UPF 402-2 together. For example, the V-UPF 104-2 may be arranged in the separated form including ULCL/BP UPF 401-2 and L-PSA UPF 402-2.

The L-PSA UPF 402-2 may function as a local PSA UPF, connect to the LDN via N6, and forward packets transmitted/received to/from an EAS 114-2.

The ULCL/BP UPF 401-2 may perform a PDU branching function. The ULCL/BP UPF 401-2 may receive a packet forwarding rule corresponding to a ULCL from the V-SMF 105-2, and branch and forward a packet received from the UE 101 to the V-UPF 104-2 based on a destination address of the UE 101 and/or an IPv6 prefix of the UE 101.

In an embodiment of the disclosure, the following colocation may be possible according to a specific implementation model.

Colocation of ULCL/BP UPF and V-UPF
Colocation of L-PSA UPF and V-UPF
Colocation of ULCL/BP UPF, L-PSA UPF, and V-UPF The V-EASDF 112-2 may perform an EAS discovery function in the visited network 410. The V-EASDF 112-2 located in the visited network 410 may be connected to the V-SMF 105-2. The V-EASDF 112-2 may receive DNS message handling rules for a session level and a node level from the V-SMF 105-2. The address of the V-EASDF 112-2 may be used as a DNS address transmitted in a protocol configuration options (PCO) to the UE 101, when a PDU session is created or changed. A home DNS server address may be transmitted to the V-EASDF 112-2 through message handling rules for a DNS Query by the V-SMF 105-2, and used as a DNS server address to which the V-EASDF 112-2 forwards a DNS Query transmitted by the UE 101 which has not registered to a local network, so that the DNS Query is transmitted to a DNS server (e.g., the DNS server 115-1) of the home network 420, for resolution of an IP address for a FQDN included in the DNS Query. Alternatively, the home DNS server address may be used as a default DNS server address. The V-EASDF 112-2 may be located in the LDN. In a specific implementation, the V-UPF 104-2 and the V-EASDF 112-2 may be collocated.

The home network 420 may include at least one of a UDM 109-1, a home PCF (H-PCF) 106-1, the H-SMF 105-1, the H-UPF 104-1, or a home DNS server 116-1.

H-PCF 106-1: It may determine a policy for an HR session.

UDM 109-1: The UDM 109-1 records whether V-SBO is allowed, for each DNN/S-NSSAI of a UE according to roaming pre-agreement between PLMNs. The UDM 109-1 is an NF that indicates whether V-SBO is allowed to the AMF 103-2 through the visited network of the UE 101 during registration. It is separate from an LBO allowed indication, and when LBO is configured to be allowed, V-SBO may be configured not to be allowed.

H-SMF 105-1: The H-SMF 105-1 may receive an SM-related context from the UDM 109-1 and finally determine whether to support V-SBO. When the H-SMF 105-1 allows V-SBO, it transmits a V-SBO allowed ack indication to the V-SMF 105-2. A DNS server address of a PCO message transmitted to the UE 101 is set to the address of the V-EASDF 112-2 provided by the V-SMF 105-2. The H-SMF 105-1 transmits a raw data collection request to the V-SMF 105-2 to collect raw data for charging. The V-SMF 105-2 collects usage data from the V-UPF 104-2 through a usage reporting rule (URR).

The UE 101 exchanges 5G control-plane messages with the AMF 103-2 through the SMFs 105-1 and 105-2. The UE 101 may access the EAS 114-2 via a PDU session through the UPFs 104-1 and 104-2 on the user plane. The UE 101 may receive the DNS server address from the V-SMF 105-1. The UE 101 may transmit a DNS Query to the DNS server address.

In an embodiment of the disclosure, an AMF (e.g., the AMF 103-2) may operate as follows:

the AMF may obtain HR roaming session policy configuration information (e.g., including an HR roaming session policy indication indicating VPLMN controlled policy decision or HPLMN controlled policy decision) from a UDM (e.g., the UDM 109-1), select an SMF (e.g., the V-SMF 105-2) in consideration of the information, and transmit the HR roaming session policy configuration information to the SMF;

the AMF may determine whether to perform H-PCF discovery and perform discovery and selection of an H-PCF (SM H-PCF) (e.g., the H-PCF 105-1) which may be involved in management of an HR roaming session (or referred to as an HR session); and/or the AMF may transmit SM H-PCF information and the HR roaming session policy indication (or an indication indicating whether HR roaming session-related SM policy association is performed) to a V-SMF (e.g., the V-SMF 105-2).

In an embodiment of the disclosure, the V-SMF (e.g., V-SMF 105-2) may operate as follows:

the V-SMF may determine whether to perform SM policy association for the HR roaming session, and select a V-PCF (e.g., the V-PCF 106-2) capable of providing an SM policy. In an embodiment of the disclosure, the V-SMF may select a V-PCF providing the SM policy, instead of a PCF providing a UE policy;

the V-SMF may transmit the H-PCF information and the HR roaming session policy configuration information (e.g., the HR roaming session policy indication) received from the AMF (e.g., the AMF 103-2) to the V-PCF, when performing SM policy association for HR roaming SBO;

the V-SMF obtains SM policy information related to the HR roaming SBO from the V-PCF or an H-SMF (e.g., the H-SMF 105-1), and configure the UPF with a rule related to a UP path configuration (e.g., including a ULCL and a configuration of a local V-PSA UPF (e.g., the UPF 402-2)) based on the obtained information through the UP path configuration; and/or the V-SMF may transmit an HR roaming session-related policy obtained from the H-SMF to the V-PCF. The V-SMF may perform policy authorization for the policy. The policy authorization may include requesting the V-PCF to identify whether the SM policy received from the home network (e.g., the home network 420) is applicable in the visited network (e.g., the visited network 410), or indicating to the V-PCF whether the policy is applicable and receiving a new policy for the HR roaming session.

In an embodiment of the disclosure, the V-PCF (e.g., V-PCF 106-2) and the H-PCF (e.g., H-PCF 106-1) may operate as follows:

the V-PCF may receive HR roaming session policy configuration information from the V-SMF (e.g., the V-SMF 105-2), determine whether to determine and create a policy according to the information, and determine whether to configure a policy for an HR roaming session in conjunction with an H-PCF. When determining to operate in conjunction with an H-PCF, the V-PCF may select and interact with the H-PCF by using H-PCF information provided by the V-SMF (e.g., the V-SMF 105-2).

The H-PCF may transmit the HR roaming session policy information determined in the home network 420 to the V-SMF through the V-PCF or the H-SMF (e.g., the H-SMF 105-1).

Figure 5A:
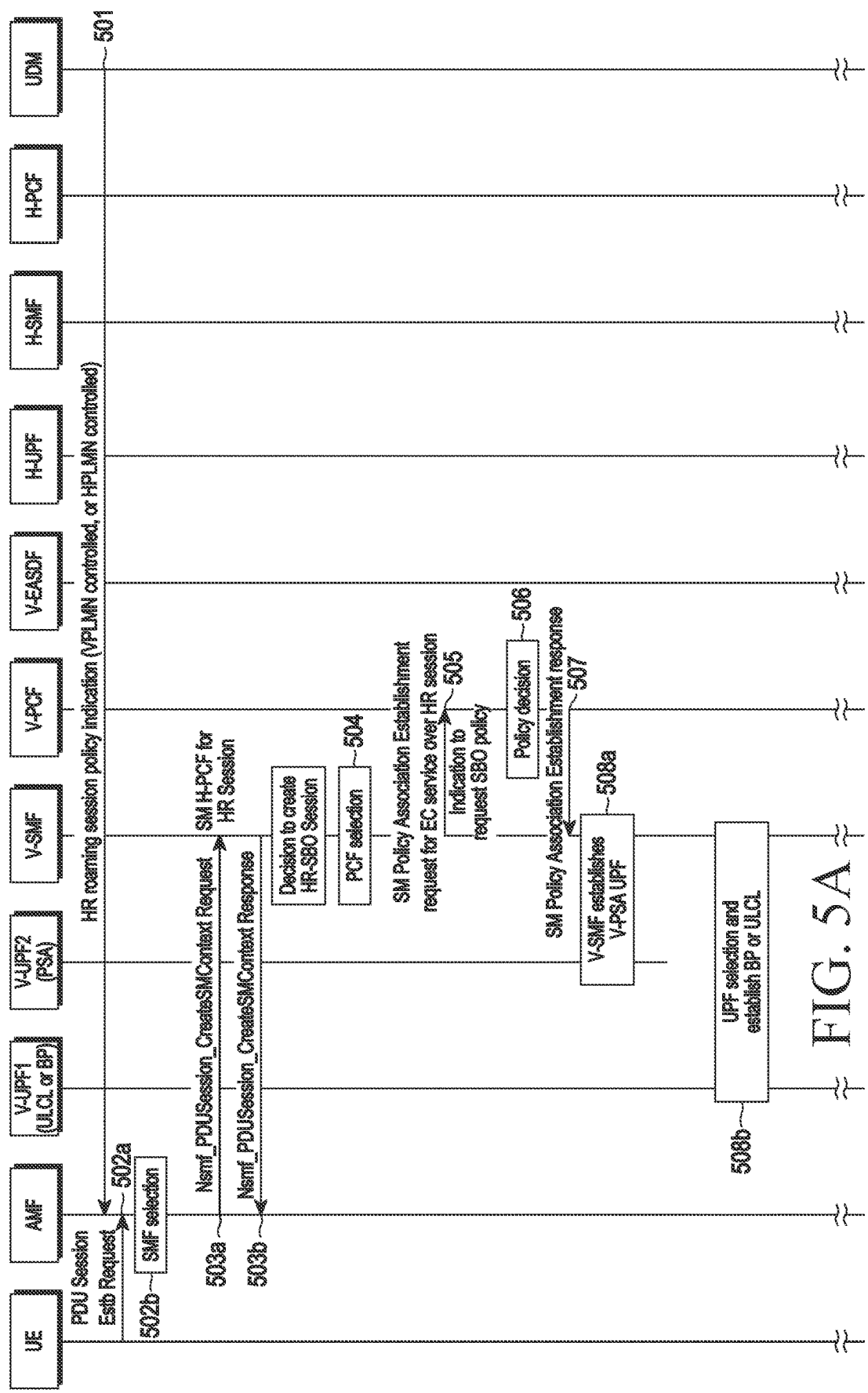
FIGS. 5A and 5B are diagrams illustrating a signal flow for a procedure of creating and applying a session management (SM) policy in a visited policy control function (V-PCF) according to various embodiments of the disclosure.
Figure 5B:
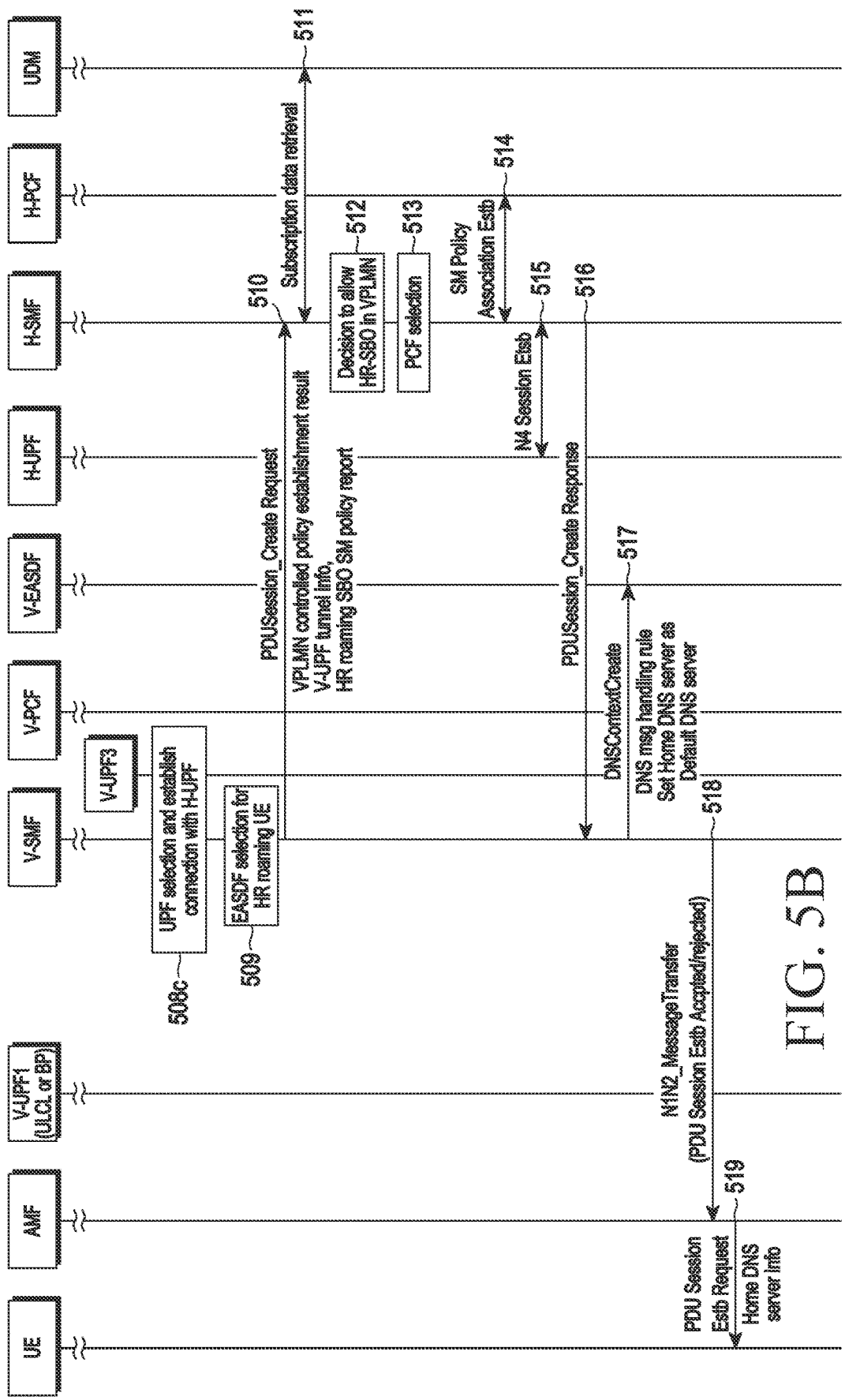

FIGS. 5A and 5B are diagrams illustrating a signal flow for a procedure of creating and applying an SM policy by a V-PCF according to various embodiments of the disclosure. At least one of operations described below may be omitted, modified, or changed in order in embodiments of the disclosure.

Referring to FIGS. 5A and 5B, in operation 501, an AMF (e.g., the AMF 103-2) may obtain, from a UDM (e.g., the UDM 109-1), at least one of information indicating whether HR roaming SBO is supported, information about whether an edge computing (EC) service is supported through HR roaming, or HR roaming session policy configuration information (e.g., an HR roaming session policy indication). The HR roaming session policy indication may include information indicating whether a visited network (e.g., the visited network 410) is capable of autonomously determining an SM policy for the HR roaming session (e.g., an indication indicating VPLMN controlled policy decision (e.g., a "VPLMN controlled" indication)) or information indicating whether to follow a policy determined by a home network (e.g., the home network 420) (e.g., an indication indicating HPLMN controlled policy decision (e.g., an "HPLMN controlled" indication)). In an embodiment of the disclosure, the UDM may provide the AMF with an indication indicating (allowing) autonomous determination and modification of an SM policy for the HR roaming session in the visited network.

The AMF may receive a PDU session establishment request message (e.g., PDU_Session_Establishment Request) from a UE (e.g., the UE 101) in operation 502a, and select a V-SMF (e.g., the V-SMF 105-2) in operation 502b. In an embodiment of the disclosure, the AMF may select an SMF supporting HR roaming SBO as the V-SMF.

In operation 503a, the AMF may transmit an SM context request message (e.g., "PDUSession_CreateSMContext Request") for creating a PDU session to the V-SMF, for example, via an Nsmf interface, and receive a PDUSession_CreateSMContext Response message from the V-SMF in response to the SM context request message in operation 503b. When the AMF recognizes that HR roaming SBO is supportable in the visited network (e.g., when the AMF receives, from the UDM, the information indicating that HR roaming SBO is supported, such as a V-SBO indication and/or the information indicating that an EC service is supported through HR roaming) in the previous operation (e.g., operation 501), the AMF may include an HR roaming SBO support indication (e.g., representable as an indication, such as the V-SBO indication) or an SM policy indication related to the HR roaming session in the request message transmitted to the V-SMF. The SM policy indication may include a VPLMN controlled policy decision indication (e.g., "VPLMN controlled") and/or an HPLMN controlled policy decision indication (e.g., "HPLMN controlled"). In the illustrated embodiment of the disclosure, a case in which the VPLMN controlled policy decision indication is included will be described.

In operation 504, the V-SMF may determine SBO to support the EC service for the HR roaming session and select a V-PCF (e.g., the V-PCF 106-2). When the V-SMF selects the V-PCF, the V-SMF may determine whether the V-PCF is involved in session management that may provide an SBO policy for the HR roaming session. In an embodiment of the disclosure, the V-SMF may select a PCF other than a PCF involved in a UE policy as the V-PCF.

In operation 505, the V-SMF may transmit an SM policy association establishment request message for the EC service through the HR session to the selected V-PCF. The request message may include the HR roaming session policy configuration information (e.g., the HR roaming session policy indication). The HR roaming session policy indication may include at least one of the VPLMN controlled policy decision indication or the HPLMN controlled policy decision indication, an indication requesting an SBO policy for the HR roaming session, or an indication indicating that the HR roaming session is related to the EC service. The request message may be transmitted to receive a policy required to support the EC service in the HR session. The policy may include, for example, information and/or parameters that define how to perform SBO in a VPLMN, how to monitor a traffic usage related to the EC service, or how to apply QoS to a branched session.

In operation 506, the V-PCF may determine how to determine/create a policy for the HR roaming session based on the HR roaming session policy configuration information and UE subscription information received from the V-SMF. For example, when the HR roaming session policy indication indicates that the VPLMN is capable of autonomously determining an HR roaming session-related policy (e.g., an SBO policy) (e.g., when "VPLMN controlled" is included), the V-PCF may autonomously create a policy without interworking with an H-PCF of a home network. In an embodiment of the disclosure, the H-PCF may consider EC-related information (e.g., EAS deployment information) stored in an H-UDR of the home network. For example, an embodiment in which the HR roaming session policy indication includes the HPLMN controlled policy decision indication ("HPLMN-controlled") may be described with reference to FIGS. 7A and 7B.

In operation 507, the V-PCF may transmit an SM policy association establishment response message to the V-SMF. The response message may include policy information indicating an SBO policy for the HR roaming session. In an embodiment of the disclosure, the policy information may include at least one piece of the following information.

HR roaming SBO execution in VPLMN indication: To support the EC service, it may instruct a UP path configuration to connect to an LDN in the VPLMN by SBO of the HR roaming session.

SBO policy information and VPLMN ECS deployment information: It may include information indicating which traffic out of traffic of the HR roaming session is to be branched to which LDN. For example, a data network access identifier (DNAI) and a traffic descriptor for the EC service may be included.

Usage monitoring-related policy: It include at least one of a usage threshold, a time threshold, or a monitoring period for a session branched from the HR roaming session to the LDN of the VPLMN.

Session aggregate maximum bit rate (AMBR) information for the HR roaming session: It may include at least one of the AMBR of a session branched from the HR roaming session to the LDN of the VPLMN and the AMBR of a session of the HR roaming session routed to an H-UPF (e.g., the H-UPF 104-1), or the total AMBR of the HR roaming session, or an allowed AMBR ratio of each of the session branched from the HR roaming session and the session of the HR roaming session routed to the HPLMN. In an embodiment of the disclosure, QoS information applied to the HR roaming session may further be included.

In operations 508a, 508b, and 508c, the V-SMF may select UPFs (e.g., including at least one of V-UPF1, V-UPF2, or V-UPF3) based on the information received from the V-PCF, establish connections with the selected UPFs, and configure UP paths for the connected UPFs, respectively. In operation 508b, the V-SMF may configure V-UPF1 (e.g., the ULCL/BP UPF 402-2) that serves as a ULCL or BP based on the HR roaming SBO execution in VPLMN indication from the V-PCF. In operation 508a, the V-SMF may configure V-UPF2 (e.g., the PSA UPF 402-2) for local access to an LDN (a data network that needs to be connected to use the EC service) in the VPLMN. In an embodiment of the disclosure, the V-SMF may configure policy information for applying the SBO policy (e.g., including the usage threshold, the time threshold, the monitoring period, or the session AMBR information for the HR roaming session branched to the LDN) received from the V-PCF for V-UPF1 serving as a ULCL/BP, and V-UPF2 responsible for transmitting the branched session to the LDN via an N4 interface. In an embodiment of the disclosure, in operation 508c, the V-SMF may select V-UPF3 being an H-UPF of the home network through UPF selection, establish a connection with V-UPF3, and establish a UP path with V-UPF3.

In operation 509, the V-SMF may select an EASDF for the EC service of the roaming UE. In an embodiment of the disclosure, the V-SMF may provide related information to the EASDF.

In operation 510, the V-SMF may transmit a PDU session creation request message (e.g., PDUSession_Create Request) to the H-SMF. The request message may provide the H-SMF with the SM policy information applied for HR roaming SBO. The SM policy information may include a result of configuring a VPLMN controlled policy (e.g., "VPLMN controlled policy configuration result") and related policy information (e.g., including usage monitoring-related information and/or session AMBR information for each of the UPF (V-UPF1) serving as a UL CL/BP, the PSA UPF (V-UPF2), and V-UPF3 through which the HR session passes), and information about the UPFs configured in the VPLMN (e.g., including at least one of V-UPF tunnel information, information for connection to the H-UPF and V-UPF3 for HR session connection, or information related to the PSA UPF (V-UPF2) in the VPLMN, which may indicate a path in which the HR session is branched to the LDN. At least part of the information may be provided to the H-SMF in the form of an SM policy configuration report related to HR roaming SBO (e.g., "HR roaming SBO SM policy report").

In operation 511, the H-SMF may identify UE subscription information about the roaming UE and roaming-related policy information stored in the UDM (e.g., the UDM 109-1) based on the information received from the V-SMF. Through this operation, the H-SMF may identify whether the EC service is allowed for the roaming UE, whether HR roaming SBO in the VPLMN is available for the roaming UE, and/or whether an SM policy for the HR roaming session of the roaming UE is configurable under the control of the VPLMN.

In operation 512, the H-SMF may determine whether to allow HR roaming SBO in the VPLMN based on the UE subscription information and the roaming-related policy information identified in operation 511, and when the HR roaming SBO in the VPLMN is allowed, proceed to operation 513.

In operation 513, the H-SMF may select an H-PCF capable of providing a policy for the HR session.

In operation 514, the H-SMF may perform an SM policy association establishment procedure with the H-PCF. During the SM policy association establishment procedure, the H-SMF may transmit the information received from the V-SMF (e.g., the policy information for the HR roaming session applied in the VPLMN and/or the information about the UPFs configured in the VPLMN) to the H-PCF. The H-PCF may create an SM policy by referring to the information received from the H-SMF (e.g., the policy information for the HR roaming session applied in the VPLMN), and provide the created SM policy to the H-SMF.

In operation 515, the H-SMF may select an H-UPF (e.g., the H-UPF 104-1) based on the SM policy received from the H-PCF, establish an N4 session connection, and provide the information about the UPFs in the VPLMN to the H-UPF via an N4 session.

In operation 516, the H-SMF may transmit a response message (e.g., PDUSession_Create Response) corresponding to the request message of operation 510 to the V-SMF. The response message may include an EC service through HR SBO allowed indication. In an embodiment of the disclosure, the response message may include a modification request indication for a policy configured in the VPLMN and/or a parameter value for modification. The V-SMF may receive information indicating success of HR session-related PDU session creation from the H-SMF and perform operations 517 and 518.

In operation 517, the V-SMF may transmit, to the V-EASDF, a message (e.g., DNSContextCreate) including a DNS message handling rule and configuration information (e.g., including a home DNS server address) that configures a home DNS server as a default DNS server. The configuration information may include a configuration request for allowing a message unrelated to the EC service among DNS messages to be transmitted to a DNS server in the home network through home routing. In operation 518, the V-SMF may transmit a PDU session creation result (e.g., PDU session establishment accept/reject) and a message (e.g., N1N2_MessageTransfer) including the home DNS server address to the AMF. In operation 519, the AMF may transmit the PDU session creation result and the home DNS server address in a PDU session establishment response message to the UE.

Figure 6A:
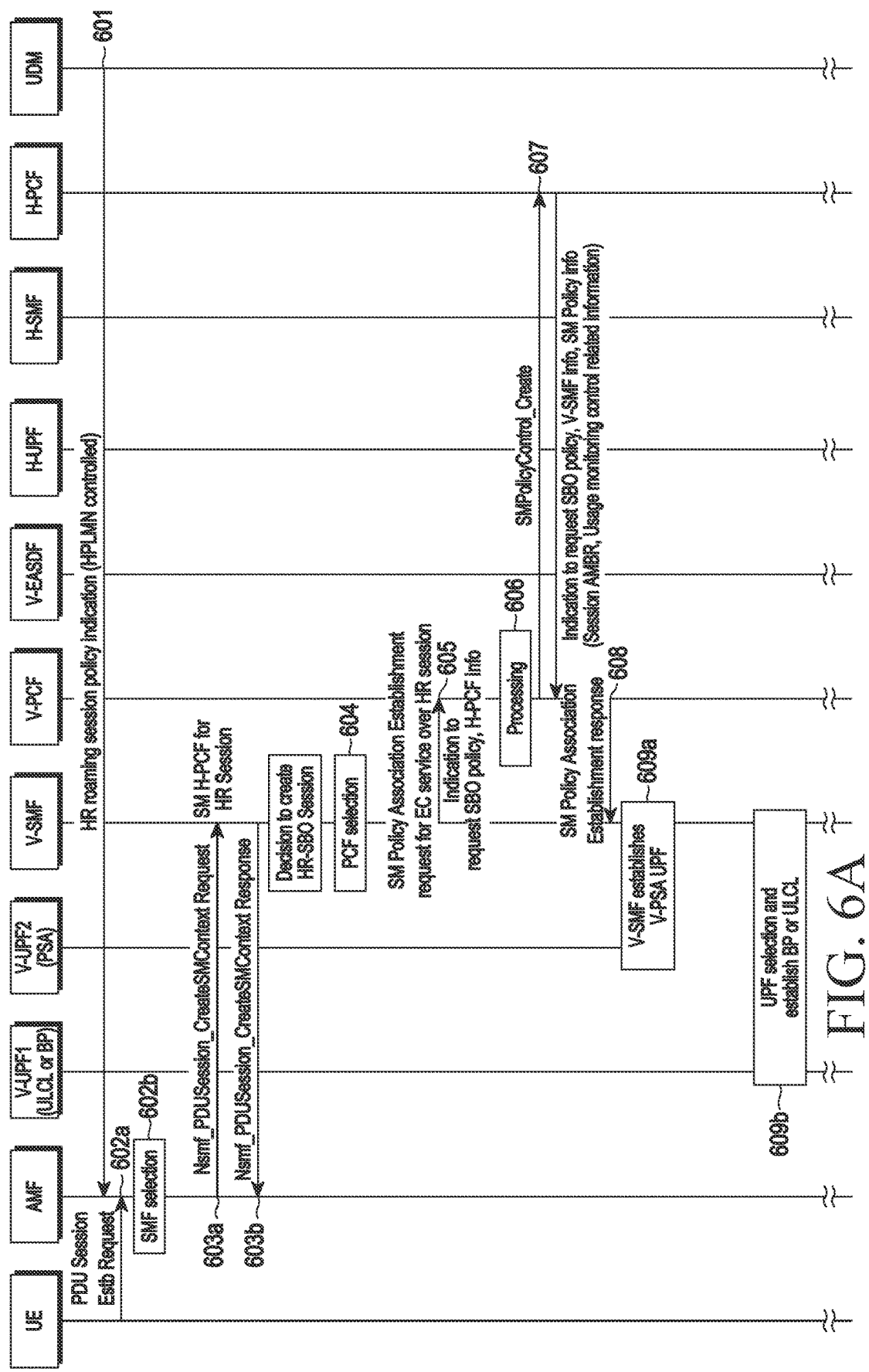
FIGS. 6A and 6B are diagrams illustrating a signal flow for a procedure of creating and applying an SM policy in conjunction with a home PCF (H-PCF) in a V-PCF according to various embodiments of the disclosure.
Figure 6B:
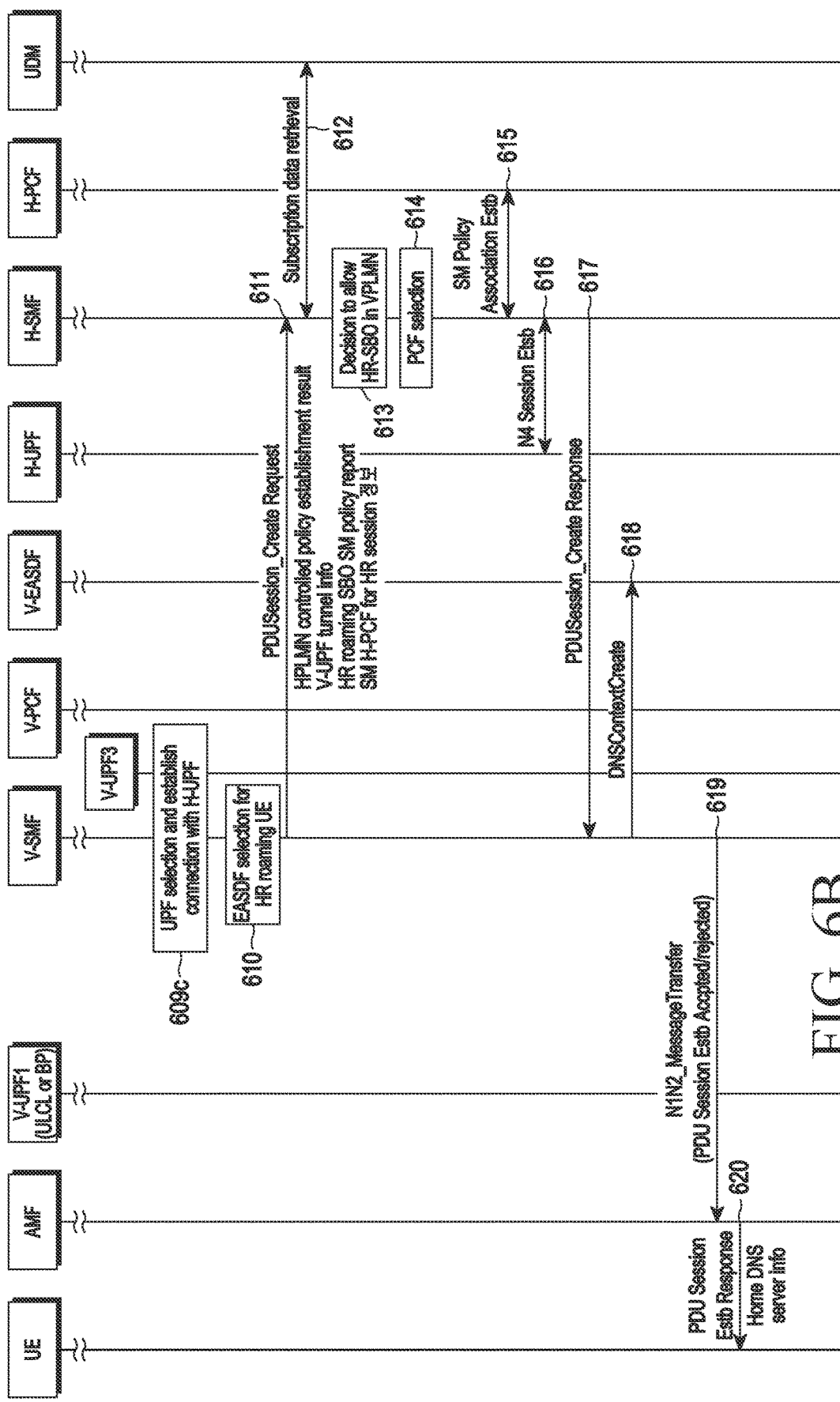

FIGS. 6A and 6B are diagrams illustrating a signal flow for a procedure of creating and applying an SM policy in conjunction with an H-PCF by a V-PCF according to various embodiments of the disclosure. At least one of operations described below may be omitted, modified, or changed in order in embodiments of the disclosure.

Referring to FIGS. 6A and 6B, in operation 601, an AMF (e.g., the AMF 103-2) may obtain, from a UDM (e.g., the UDM 109-1), at least one of information indicating whether HR roaming SBO is supported, information about whether an EC service is supported through HR roaming, or HR roaming session policy configuration information (e.g., an HR roaming session policy indication). The HR roaming session policy indication may include information indicating whether a visited network (e.g., the visited network 410) is capable of autonomously determining an SM policy for the HR roaming session (e.g., an indication indicating VPLMN controlled policy decision (e.g., a "VPLMN controlled" indication)) or information indicating whether to follow a policy determined by a home network (e.g., the home network 420) (e.g., an indication indicating HPLMN controlled policy decision (e.g., an "HPLMN controlled" indication)). The AMF may identify the indication indicating HPLMN controlled policy decision (e.g., the "HPLMN controlled") and perform the following operations.

The AMF may receive a PDU session establishment request message (e.g., PDU_Session_Establishment Request) from a UE (e.g., the UE 101) in operation 602a, and select a V-SMF (e.g., the V-SMF 105-2) in operation 602b. In an embodiment of the disclosure, the AMF may select an SMF supporting HR roaming SBO as the V-SMF.

When the HR roaming session policy indication that the AMF has received from the UDM in operation 601 indicates HPLMN controlled policy decision ("HPLMN controlled") or a local-configured policy for the AMF is indicated as requiring interaction with an H-PCF (e.g., the H-PCF 106-1), the AMF may perform H-PCF discovery and selection to detect information about an H-PCF. An example in which the AMF obtains H-PCF information (e.g., an ID and/or an address) is given as follows. For example, when the UDM provides information about an HR roaming session policy to the AMF, the UDM may provide the H-PCF information together. In another example, the AMF may obtain the H-PCF information from an NRF in the same manner as direct detection of an H-SMF.

The AMF may detect the H-PCF information, for example, after receiving the HR roaming session policy configuration information from the UDM (e.g., during a registration procedure) as in operation 601, or after receiving the PDU session creation request from the UE as in operation 602a. The H-PCF that the AMF should detect to configure a policy for the HR roaming session may be a PCF that handles an SM policy. For example, the H-PCF may have a function of determining a policy for the HR roaming session. Accordingly, a PCF other than a PCF involved in a UE policy may be selected as the H-PCF.

In operation 603a, the AMF may transmit a PDUSession_CreateSMContext Request message to the V-SMF, for example, via an Nsmf interface, and receive a PDUSession_CreateSMContext Response message from the V-SMF in response to the PDUSession_CreateSMContext Request message in operation 603b. When the AMF recognizes that HR roaming SBO is supportable in the visited network (e.g., when the AMF receives, from the UDM, the information indicating that HR roaming SBO is supportable and/or the information indicating that the EC service is supported through HR roaming) in the previous operation (e.g., operation 601), the AMF may include an HR roaming SBO support indication or an SM policy indication related to the HR roaming session in the response message transmitted to the V-SMF. The SM policy indication may include a VPLMN controlled policy decision indication (e.g., "VPLMN controlled") or an HPLMN controlled policy decision indication (e.g., "HPLMN controlled"). In the illustrated embodiment of the disclosure, a case in which the HPLMN controlled policy decision indication is included will be described. The AMF may provide the afore-described H-PCF information to the V-SMF by the response message.

In operation 604, the V-SMF may determine SBO to support the EC service for the HR roaming session (in other words, determine to create an HR SBO session) and select a V-PCF (e.g., the V-PCF 106-2). The V-SMF may select an SM H-PCF for the HR session, which may be involved in session management that may provide an SBOR policy for the HR roaming session. In an embodiment of the disclosure, the V-SMF may select a PCF other than a PCF involved in a UE policy as the V-PCF.

In operation 605, the V-SMF may transmit an SM policy association establishment request message for the EC service through the HR session to the selected V-PCF. The request message may include the H-PCF information (e.g., the ID and/or the address, and the ID of a PLMN to which the H-PCF belongs), the HR roaming session policy configuration information (e.g., the HR roaming SM indication). The HR roaming session policy indication may include at least one of the HPLMN controlled policy decision indication (e.g., "HPLMN controller"), an indication requesting an SBO policy for the HR session, or an indication indicating that the HR roaming session is related to the EC service. The request message may be transmitted to receive a policy required to support the EC service in the HR session. The policy may include, for example, information and/or parameters that define how to perform SBO in the VPLMN, how to monitor a traffic usage related to the EC service, or how to apply QoS to a branched session.

In operation 606, the V-PCF may determine how to determine/create a policy for which HR roaming session in conjunction with the H-PCF, based on the HR roaming session policy configuration information and UE subscription information received from the V-SMF. For example, when the HR roaming session policy indication indicates that the VPLMN is to determine an HR roaming session-related policy in conjunction with the H-PCF (e.g., when "HPLMN controlled" is included), the V-PCF may create a policy in conjunction with the H-PCF of a home network. In an embodiment of the disclosure, the V-PCF may determine whether to interact with the H-PCF based on the H-PCF information obtained from the V-SMF (e.g., the H-PCF information may be H-PCF information that the V-SMF has obtained from the AMF or directly through an NRF). For example, the V-PCF may determine whether to interact with the H-PCF of the home network by comparing the ID of a PLMN to which the H-PCF belongs with configuration information in the V-PCF.

In operation 607, the V-PCF may transmit an SM policy control creation request message (e.g., SMPolicyControl_Create Request) to the H-PCF. The request message may include an indication requesting an SBO policy for the HR roaming session (e.g., an "indication to request SBO policy"), a policy related to HR roaming SBO, applicable to the VPLMN, and information (e.g., "V-SMF info") about a V-SMF that manages the HR roaming session. The H-PCF may determine an SM policy (e.g., including an SBO policy) for the HR roaming session in conjunction with a UDM (e.g., the UDM 109-1) or an H-UDR, and transmit a response message including the determined SBO policy to the V-PCF. In an embodiment of the disclosure, the policy related to HR roaming SBO may include at least one piece of the following information.

HR roaming SBO execution in VPLMN indication: To support the EC service, it may instruct a UP path configuration to connect to an LDN in the VPLMN by SBO of the HR roaming session. Alternatively, it may be referred to as an HR roaming SBO allowed in VPLMN indication.

SBO policy information and VPLMN ECS deployment information: It may include information indicating which traffic out of traffic of the HR roaming session is to be branched to which LDN. For example, a DNAI and a traffic descriptor for the EC service may be included.

Usage monitoring-related policy (e.g., "usage monitoring control related information"): It include at least one of a usage threshold, a time threshold, or a monitoring period for a session branched from the HR roaming session to the LDN of the VPLMN.

Session AMBR information for the HR roaming session: It may include at least one of the AMBR of a session branched from the HR roaming session to the LDN of the VPLMN and the AMBR of a session of the HR roaming session routed to an H-UPF (e.g., the H-UPF 104-1), or the total AMBR of the HR roaming session, or an allowed AMBR ratio of each of the session branched from the HR roaming session and the session of the HR roaming session routed to the HPLMN. In an embodiment of the disclosure, QoS information applied to the HR roaming session may further be included.

Indication allowing modification of session-related policy provided by HPLMN: It may indicate whether the VPLMN is allowed to modify and apply an SBO policy for the HR roaming session (e.g., a user monitoring policy and/or session AMBR information for the HR roaming session) provided by the H-PCF.

In operation 608, the V-PCF may identify the policy information indicating an SBO policy for the HR roaming session, obtained from the H-PCF (e.g., which may include information indicating whether it is a policy applicable in the VPLMN and/or an allowed usage threshold), and transmit an SM policy association establishment response message including the policy information to the V-SMF. In an embodiment of the disclosure, the V-PCF may modify the policy obtained from the H-PCF adaptively according to a VPLMN environment or the capability of the V-PCF. In an embodiment of the disclosure, when the SBO policy for the HR roaming session obtained from the H-PCF is difficult to apply, the V-PCF may notify the H-PCF that the SBO policy is not applicable. In an embodiment of the disclosure, when the SBO policy for the HR roaming session obtained from the H-PCF is difficult to apply, the V-PCF may modify the SBO policy so that the SBO policy is applicable to the VPLMN, transmit policy information indicating the modified SBO policy to the H-PCF, and get the modified session policy authorized by the H-PCF.

In operations 609a, 609b, and 609c, the V-SMF may select UPFs based on the HR roaming SM policy (e.g., including an SBO policy) obtained from the V-PCF, establish connections with the selected UPFs, and configure UP paths for the connected UPFs, respectively. In operation 609b, the V-SMF may configure V-UPF1 (e.g., the ULCL/BP UPF 402-2) that serves as a ULCL/BP with at least required part of the SM policy. In operation 609a, the V-SMF may configure at least required part of the SM policy for V-UPF2 (e.g., the PSA UPF 402-2) serving as an anchor for a session branched to an LDN of the VPLMN. In operation 609c, the V-SMF may configure at least required part of the SM policy for V-UPF3 being a UPF for connecting the HR roaming session to the H-UPF. Different policies may be established for V-UPF1, V-UPF2, and V-UPF3, respectively.

In operation 610, the V-SMF may select a V-EASDF (e.g., the V-EASDF 112-2) based on the information obtained from the V-PCF, and perform a preparation operation to provide the EC service through HR roaming SBO.

In operation 611, the V-SMF may transmit a PDU session creation request message (e.g., PDUSession_Create Request) to the H-SMF. The request message may provide the H-SMF with SM policy information applied for HR roaming SBO. The SM policy information may include a result of HPLMN controlled policy decision (e.g., "HPLMN controlled policy configuration result") and policy information (e.g., including usage monitoring-related information and/or session SMNR information configured for each of the UPF (V-UPF1) serving as a UL CL/BP, the PSA UPF (V-UPF2), and V-UPF3 through which the HR session passes) based on the result, and information about the UPFs configured in the VPLMN (e.g., including at least one of V-UPF tunnel information, information for connection to the H-UPF and V-UPF3 for HR session connection, or information (e.g., DNAI) related to the PSA UPF (V-UPF2) in the VPLMN, which may indicate a path in which the HR session is branched to the LDN. At least part of the information may be provided to the H-SMF in the form of an SM policy configuration report related to HR roaming SBO (e.g., "HR roaming SBO SM policy report"). In an embodiment of the disclosure, the V-SMF may transmit information about the V-PCF that has performed SM policy association related to the HR roaming session in the VPLMN, and the H-PCF information received from the AMF (information about the H-PCF interacting with the V-PCF, for policy configuration for the HR roaming session) (e.g., "SM H-PCF for HR session")) in the request message to the H-SMF.

In operation 612, the H-SMF may identify UE subscription information (e.g., subscription data) about the roaming UE (e.g., the UE 101) and roaming-related policy information stored in a UDM based on the information received from the V-SMF. The H-SMF may identify whether the EC service is allowed for the roaming UE, whether HR roaming SBO in the VPLMN is available for the roaming UE, and/or whether an SM policy for the HR roaming session of the roaming UE is configurable under the control of the VPLMN.

In operation 613, the H-SMF may re-determine whether to allow HR roaming SBO in the VPLMN based on the UE subscription information and the roaming-related policy information identified in operation 612, and when HR SBO in the VPLMN is allowed, proceed to operation 614.

In operation 614, the H-SMF may select an H-PCF capable of providing a policy for the HR session. In an embodiment of the disclosure, the H-SMF may select an H-PCF corresponding to the H-PCF information received from the V-SMF (e.g., a PCF interacting with the V-PCF, for policy configuration for the HR roaming session).

In operation 615, the H-SMF may perform an SM policy association establishment procedure with the selected H-PCF. During the SM policy association establishment procedure, the H-SMF may transmit the information received from the V-SMF (e.g., the policy information for the HR roaming session applied in the VPLMN and/or the information about the UPFs configured in the VPLMN) to the H-PCF. The H-PCF may create an SM policy by referring to the information received from the H-SMF (e.g., the policy information for the HR roaming session applied in the VPLMN), and provide the created SM policy to the H-SMF.

In operation 616, the H-SMF may select an H-UPF (e.g., the H-UPF 104-1) based on the SM policy received from the H-PCF, establish an N4 session connection, and provide the information about the UPFs (e.g., information about V-UPF3 to be connected to the H-UPF) in the VPLMN to the H-UPF by an N4 session establishment message.

In operation 617, the H-SMF may transmit a response message (e.g., PDUSession_Create Response) corresponding to the request message of operation 611 to the V-SMF. The response message may include an EC service through HR SBO allowed indication. In an embodiment of the disclosure, the response message may include a modification request indication for a policy established in the VPLMN and/or a parameter value in the HR roaming SBO-related policy for modification. The parameter value may include, for example, the AMBR or usage threshold of each of a session branched from the HR roaming session and connected to the LDN of the VPLMN and a session routed to the H-UPF of the HPLMN.

In operation 618, the V-SMF may transmit, to the V-EASDF, a message (e.g., DNSContextCreate) including a DNS message handling rule for handling a DNS message transmitted through the HR roaming session. The message may include a configuration request for allowing a message unrelated to the EC service among DNS messages to be transmitted to a DNS server in the home network through HR. In operation 619, the V-SMF may transmit a message (e.g., N1N2_MessageTransfer) including a PDU session creation result (e.g., PDU session establishment accept/reject) and a home DNS server address to the AMF. In operation 620, the AMF may transmit the PDU session creation result and the home DNS server address to the UE by a PDU session establishment response message.

Figure 7A:
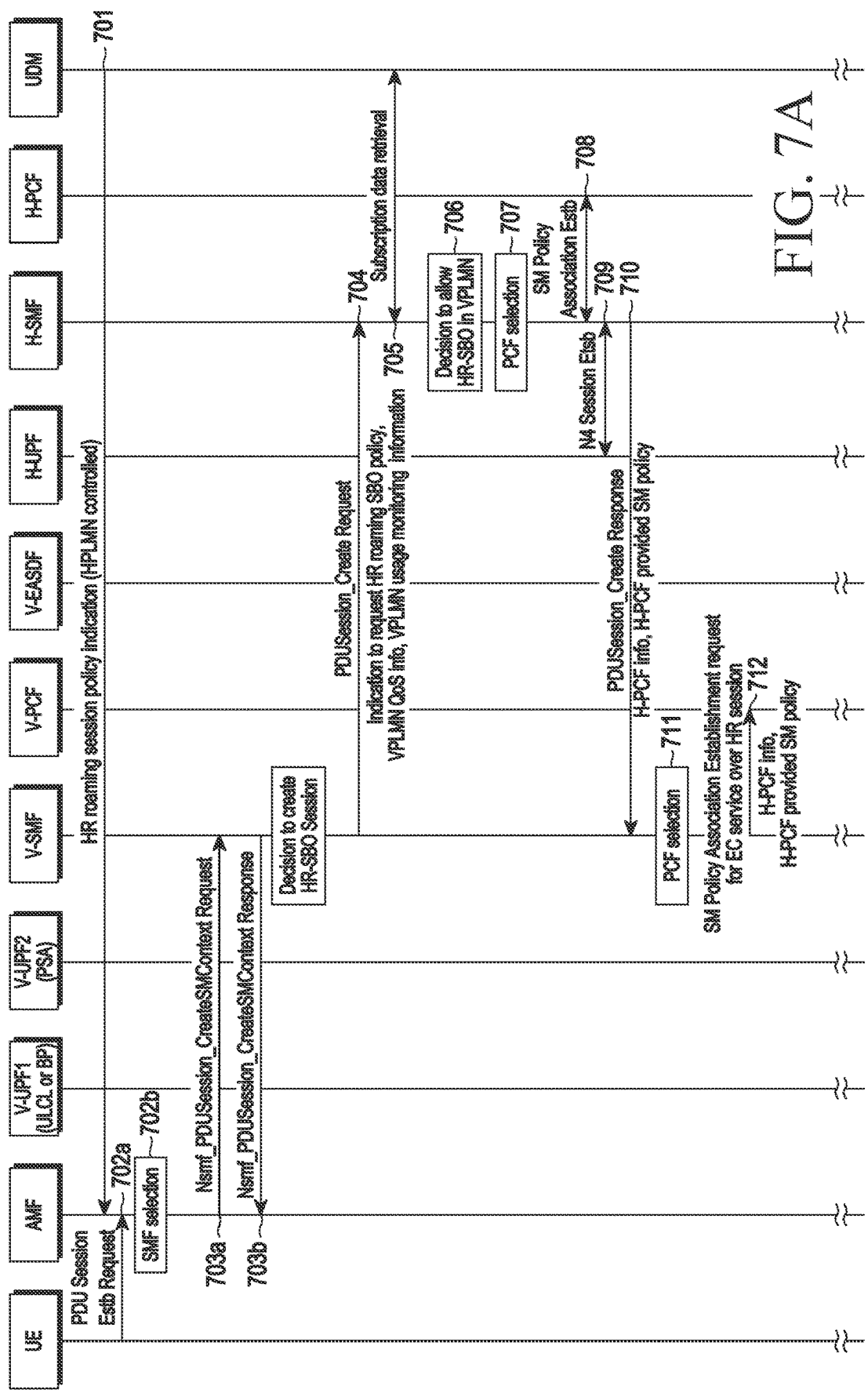
FIGS. 7A and 7B are diagrams illustrating a signal flow for a procedure of creating and applying an SM policy in conjunction with an H-PCF in a V-PCF according to various embodiments of the disclosure.
Figure 7B:
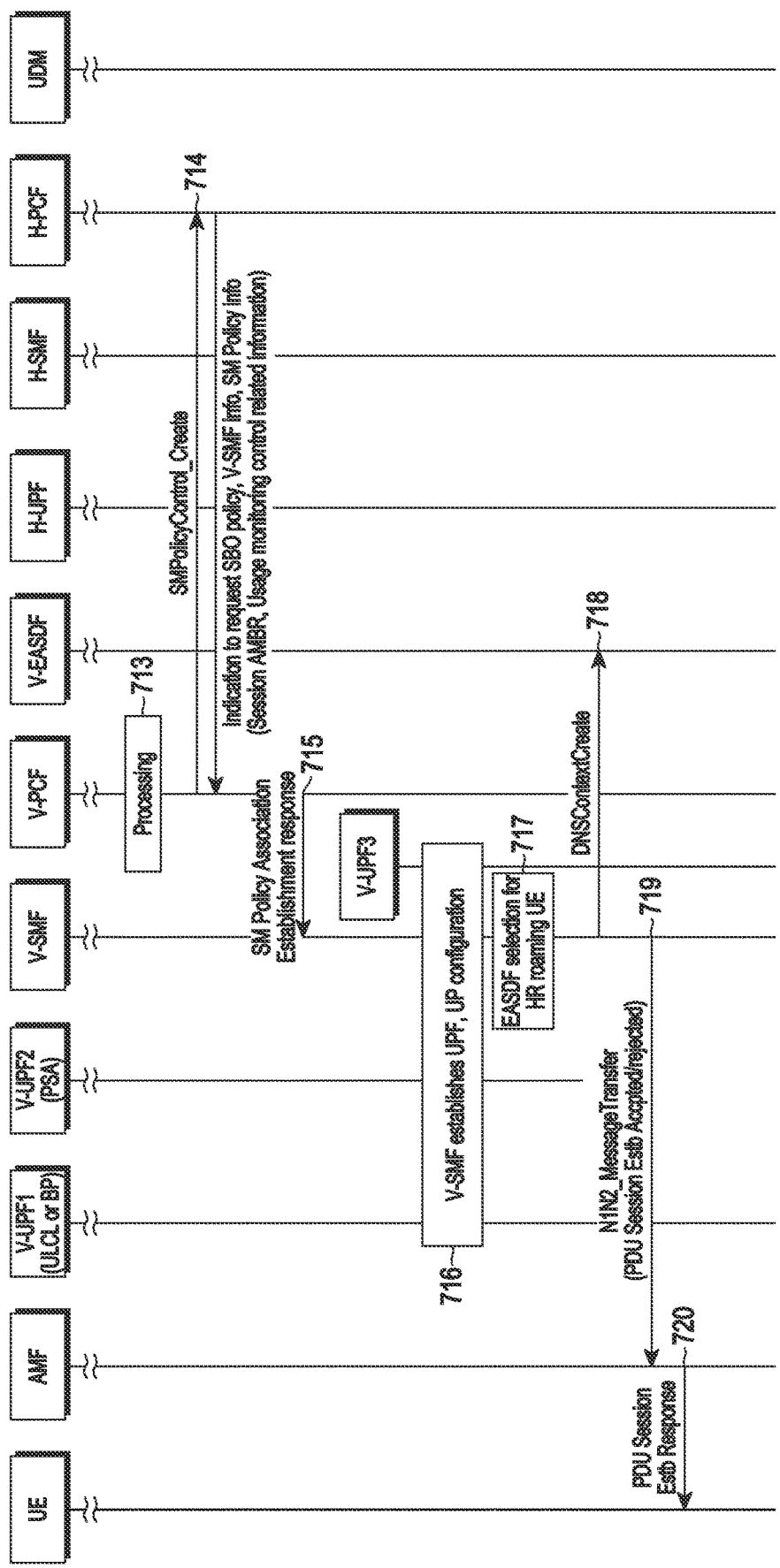

FIGS. 7A and 7B are diagrams illustrating a signal flow for a procedure of creating and applying an SM policy in conjunction with an H-PCF by a V-PCF according to various embodiments of the disclosure. At least one of operations described below may be omitted, modified, or changed in order in embodiments of the disclosure.

Referring to FIGS. 7A and 7B, in operation 701, an AMF (e.g., the AMF 103-2) may obtain, from a UDM (e.g., the UDM 109-1), at least one of information indicating whether HR roaming SBO is supported, information indicating whether an EC service is supported through HR roaming, or HR roaming session policy configuration information (e.g., an HR roaming session policy indication). The HR roaming session policy indication may include information indicating whether a visited network (e.g., the visited network 410) is capable of autonomously determining an SM policy for the HR roaming session (e.g., an indication indicating VPLMN controlled policy decision (e.g., a "VPLMN controlled" indication)) or information indicating whether to follow a policy determined by a home network (e.g., the home network 420) (e.g., an indication indicating HPLMN controlled policy decision (e.g., an "HPLMN controlled" indication)). The AMF may identify the indication indicating HPLMN controlled policy decision (e.g., "HPLMN controlled") and perform the following operations.

Similarly to operations 602a and 602b of FIGS. 6A and 6B, the AMF may receive a PDU session establishment request message (e.g., PDU_Session_Establishment Request) from a UE (e.g., the UE 101,) and select a V-SMF (e.g., the V-SMF 105-2) in operations 702a and 702b. In an embodiment of the disclosure, the AMF may determine that interaction with an H-PCF is unnecessary, and skip H-PCF discovery and selection.

The AMF may transmit a PDUSession_CreateSMContext Request message to the V-SMF in operation 703a, and receive a PDUSession_CreateSMContext Response message from the V-SMF in response to the PDUSession_CreateSMContext Request message in operation 703b. When the AMF recognizes that HR roaming SBO is supportable in the visited network (e.g., when the AMF receives, from the UDM, the information indicating that HR roaming SBO is supported and/or the information indicating that the EC service is supported through HR roaming) in the previous operation (e.g., operation 701), the AMF may include an HR roaming SBO support indication or an HR roaming session-related SM policy indication in the response message transmitted to the V-SMF. The SM policy indication may include a VPLMN controlled policy decision indication (e.g., "VPLMN controlled") and/or an HPLMN controlled policy decision indication (e.g., "HPLMN controlled"). In the illustrated embodiment of the disclosure, a case in which the HPLMN controlled policy decision indication is included will be described. When obtaining H-PCF information, the AMF may transmit the H-PCF information in the response message to the V-SMF.

In operation 704, the V-SMF may determine to create an HR SBO session and transmit a PDU session creation request message (e.g., PDUSession_Create Request) to the H-SMF. The request message may include an indication requesting an HR roaming SBO-related SM policy (e.g., an "indication to request HR roaming SBO policy"). In an embodiment of the disclosure, the V-SMF may provide the H-SMF with parameters required to create and establish an SM policy together with VPLMN usage monitoring information including QoS information allowed in the VPLMN (e.g., "VPLMN QoS info") (e.g., which may include session AMBR information) or a usage threshold by the request message. When the V-SMF receives the H-PCF information from the AMF in operation 703a, the H-PCF information may be transmitted in the request message to the H-SMF.

In operation 705, the H-SMF may identify the indication requesting the HR roaming SBO-related SM policy (e.g., the "indication to request HR roaming SBO policy") or the SM policy indication related to the HR roaming session (e.g., "HPLMN controlled") from the request message received from the V-SMF, and identify UE subscription information (e.g., subscription data) about a roaming UE (e.g., the UE 101) and roaming-related policy information stored in a UDM. The H-SMF may identify whether the EC service is allowed for the roaming UE, whether HR roaming SBO in the VPLMN is available for the roaming UE, and/or whether an SM policy for the HR roaming session of the roaming UE is configurable under the control of the VPLMN, based on the identified information.

In operation 706, the H-SMF may determine whether HR SBO is allowed in the VPLMN based on the UE subscription information and the roaming-related policy information identified in operation 705, and when HR SBO in the VPLMN is allowed, proceed to operation 707.

In operation 707, the H-SMF may select an H-PCF capable of providing a policy for the HR session. In an embodiment of the disclosure, the H-SMF may select an H-PCF corresponding to the H-PCF information received from the V-SMF (e.g., a PCF interacting with the V-PCF, for policy configuration for the HR roaming session).

In operation 708, the H-SMF may perform an SM policy association establishment procedure with the selected H-PCF. During the SM policy association establishment procedure, the H-SMF may transmit, to the H-PCF, an indication requesting a policy for the HR roaming session and parameters (e.g., the QoS information allowed in the VPLMN (e.g., the session AMBR information) and/or the usage monitoring information, such as a usage threshold) required for creation and configuration of the SM policy, received from the V-SMF, and receive policy information for the HR roaming session from the H-PCF.

The H-PCF may create an SM policy for the HR roaming session by identifying the information received from the H-SMF and the UE subscription information (e.g., roaming session management information in SM-related subscription data and/or EC service-related information) about the roaming UE and the roaming-related policy information stored in the UDM or the UDR, and transmit the created SM policy to the H-SMF. The SM policy may include an HR roaming SBO-related policy to be applied to UPFs (e.g., V-UPFs 1, 2 and 3) in the VPLMN as well as an H-UPF in the HPLMN. In an embodiment of the disclosure, the HR roaming SBO-related policy may include at least one piece of the following information.

HR roaming SBO execution in VPLMN indication: To support the EC service, it may instruct a UP path configuration to connect to an LDN in the VPLMN by SBO of the HR roaming session. Alternatively, it may be referred to as an HR roaming SBO allowed in VPLMN indication.

Usage monitoring-related policy (e.g., "usage monitoring control related information"): It may include at least one of information related to a threshold for a total usage of the HR roaming session, and/or usage monitoring information (e.g., a usage threshold, a time threshold, or a monitoring period) for each of a session branched from the HR roaming session to the LDN of the VPLMN and at least one session (i.e., the HR session) routed to the HPLMN.

Session AMBR information (e.g., "session AMBR") for the HR roaming session: It may include at least one of the AMBR of a session branched from the HR roaming session to the LDN of the VPLMN and the AMBR of a session of the HR roaming session routed to an H-UPF (e.g., the H-UPF 104-1), or the total AMBR of the HR roaming session, or an allowed AMBR ratio of each of the session branched from the HR roaming session and the session of the HR roaming session routed to the HPLMN. In an embodiment of the disclosure, QoS information applied to the HR roaming session may further be included.

In an embodiment of the disclosure, the H-PCF may provide an allowed indication indicating whether modification and application of an SM policy for HR roaming SBO is allowed in the VPLMN (e.g., the V-PCF or the V-SMF) in operation 708. The allowed indication may indicate whether the V-SMF or the V-PCF is allowed to modify and apply an HR roaming SBO-related policy created by the H-PCF.

In operation 709, the H-SMF may select an H-UPF (e.g., the H-UPF 104-1) based on the SM policy received from the H-PCF, establish an N4 session connection, and provide information about a UPF in the VPLMN (information about to V-UPF3 to be connected to the H-UPF) to the H-UPF by an N4 session establishment message.

In operation 710, the H-SMF may transmit a response message (e.g., PDUSession_Create Response) corresponding to the request message of operation 704 to the V-SMF. The response message may include an EC service through HR SBO allowed indication and/or the HR roaming SBO-related SM policy received from the H-PCF. In an embodiment of the disclosure, the H-SMF may provide the V-SMF with information about the H-PCF (e.g., the ID and/or address of the H-PCF) with which the H-SMF has performed SM policy association.

In action 711, the V-SMF may determine SBO for supporting the EC service for the HR roaming session (in other words, determine to create an HR SBO session) based on the HR roaming session-related policy information (e.g., the SM policy) received from the H-SMF and/or local configuration information, and select a V-PCF (e.g., the V-PCF 106-2). The V-SMF may select an SM H-PCF for the HR session, which may be involved in session management that may provide an SBO policy for the HR roaming session. In an embodiment of the disclosure, the V-SMF may select a PCF other than a PCF involved in a UE policy as the V-PCF. In an embodiment of the disclosure, the V-SMF may discover and select the V-PCF using the H-PCF information received from the H-SMF. In an embodiment of the disclosure, the V-SMF may provide H-PCF-related information to an NRF and obtain V-PCF information from the NRF, to select a V-PCF communicable with the H-PCF.

In operation 712, the V-SMF may transmit an SM policy association establishment request message for the EC service through the HR session to the selected V-PCF. The request message may include at least one of an HR roaming session-related SM policy indication, the H-PCF information (e.g., the ID and/or the address, and/or the ID of a PLMN to which the H-PCF belongs), or the policy information related to the HR roaming session (created by the H-PCF) received from the H-SMF.

In an embodiment of the disclosure, the V-SMF may perform UP path configuration based on the policy created by the H-PCF, while skipping the SM policy association establishment procedure (operations 12 to 15) with the V-PCF. For example, upon receipt of an indication indicating that modification of the policy created by the H-PCF is not allowed from the HPLMN, the V-SMF may determine to skip operations 12 to 15 for SM policy association establishment.

In operation 713, the V-PCF may perform policy authorization for the HR roaming-related policy information received from the V-SMF (e.g., the SM policy information that the H-PCF has created and transmitted to the V-SMF through the H-SMF). In an embodiment of the disclosure, the policy authorization may include determining whether a policy corresponding to the policy information is applicable and/or needs modification in the VPLMN by the V-PCF. In an embodiment of the disclosure, the V-PCF may determine whether it is possible to modify the policy according to the indication provided by the H-PCF. When determining that the SM policy for the HR roaming session, received from the HPLMN needs to be modified, the V-PCF may proceed to operation 714.

In operation 714, the V-PCF may transmit a message (e.g., "SMPolicyControl_Create") requesting modification of the HR roaming SBO-related policy to the H-PCF identified by the H-PCF information received from the V-SMF. The V-PCF may transmit an indication requesting an SBO policy for the HR roaming session (e.g., an "indication to request SBO policy"), V-SMF information, and information about an SM policy applicable to the VPLMN (e.g., at least one of a session AMBR or usage monitoring control-related information) in the message.

The H-PCF may create a new SM policy or modify the SM policy created in operation 708 according to the information about the SM policy applicable to the VPLMN, included in the message received from the V-PCF, and transmit the created or modified SM policy to the V-PCF in operation 714. In an embodiment of the disclosure, the H-PCF may accept the SM policy indicated by the information about the SM policy applicable to the VPLMN, provided by the V-PCF, and transmit an indication indicating that the SM policy is allowed to the V-PCF, in conjunction with the UDM or the UDR in operation 714.

In operation 715, the V-PCF may transmit policy information indicating the HR roaming SBO-related SM policy received from the H-PCF to the V-SMF by an SM policy association establishment response message. In an embodiment of the disclosure, upon receipt of an indication indicating that the SM policy applicable to the VPLMN is allowed in operation 714, the V-PCF may transmit the SM policy applicable to the VPLMN determined in operation 713 in the SM policy association establishment response message to the V-SMF in operation 715.

In operation 716, the V-SMF may select UPFs, establish connections with the selected UPFs, and configure UP paths with the selected UPFs in the same manner as in operations 609a, 609b, and 609c. In an embodiment of the disclosure, the V-SMF may configure the UP paths in V-UPFs (e.g., V-UPF1 (ULCL or BP), V-UPF2 (PSA), and V-UPF3) based on the HR roaming SBO-related SM policy. In an embodiment of the disclosure, QoS information (e.g., a session AMBR) or a usage monitoring-related policy for V-UPFs 1, 2, and 3 may be configured by an SM policy of the V-SMF. In an embodiment of the disclosure, the V-SMF may report to the H-SMF that the UP paths have been successfully configured.

In operation 717, the V-SMF may select a V-EASDF (e.g., the V-EASDF 112-2) based on the information obtained from the V-PCF and perform a preparation operation for provisioning of the EC service through HR roaming SBO.

In operation 718, the V-SMF may transmit a message (e.g., DNSContextCreate) including a DNS message handling rule for handling DNS messages delivered in the HR roaming session to the V-EASDF based on the response message indicating the success of PDU session creation, received from the H-SMF in operation 710. The message may include a configuration request for allowing a message unrelated to the EC service among DNS messages to be routed to a DNS server in the home network through HR. In operation 719, the V-SMF may transmit a message (e.g., N1N2_MessageTransfer) including a PDU session creation result (e.g., PDU session establishment accept/reject) and a home DNS server address to the AMF. In operation 720, the AMF may transmit the PDU session result and the home DNS server address to the UE by a PDU session establishment response message.

Figure 8A:
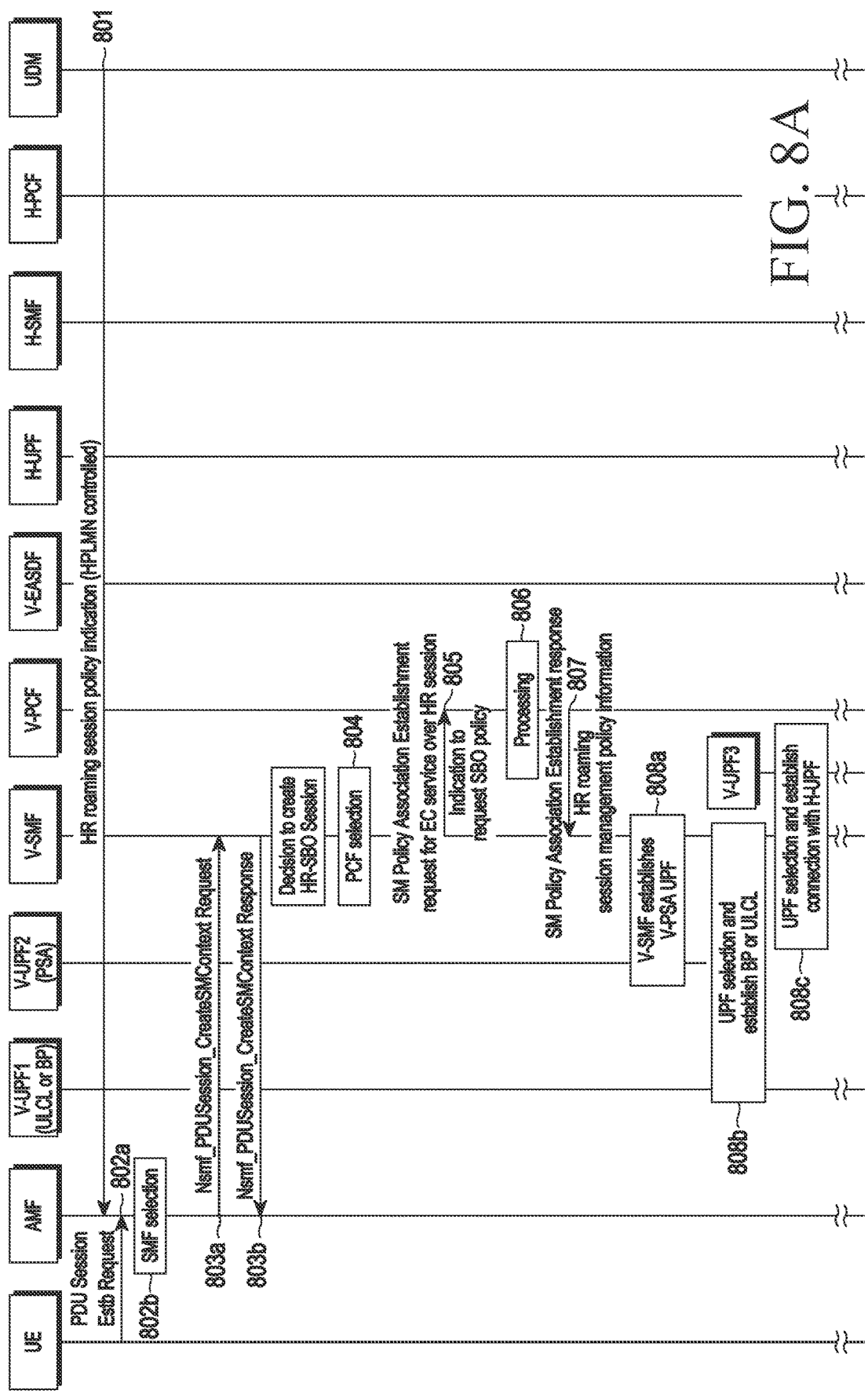
FIGS. 8A and 8B are diagrams illustrating a signal flow for a procedure of creating and applying an SM policy in conjunction with an H-PCF in a V-PCF according to various embodiments of the disclosure.
Figure 8B:
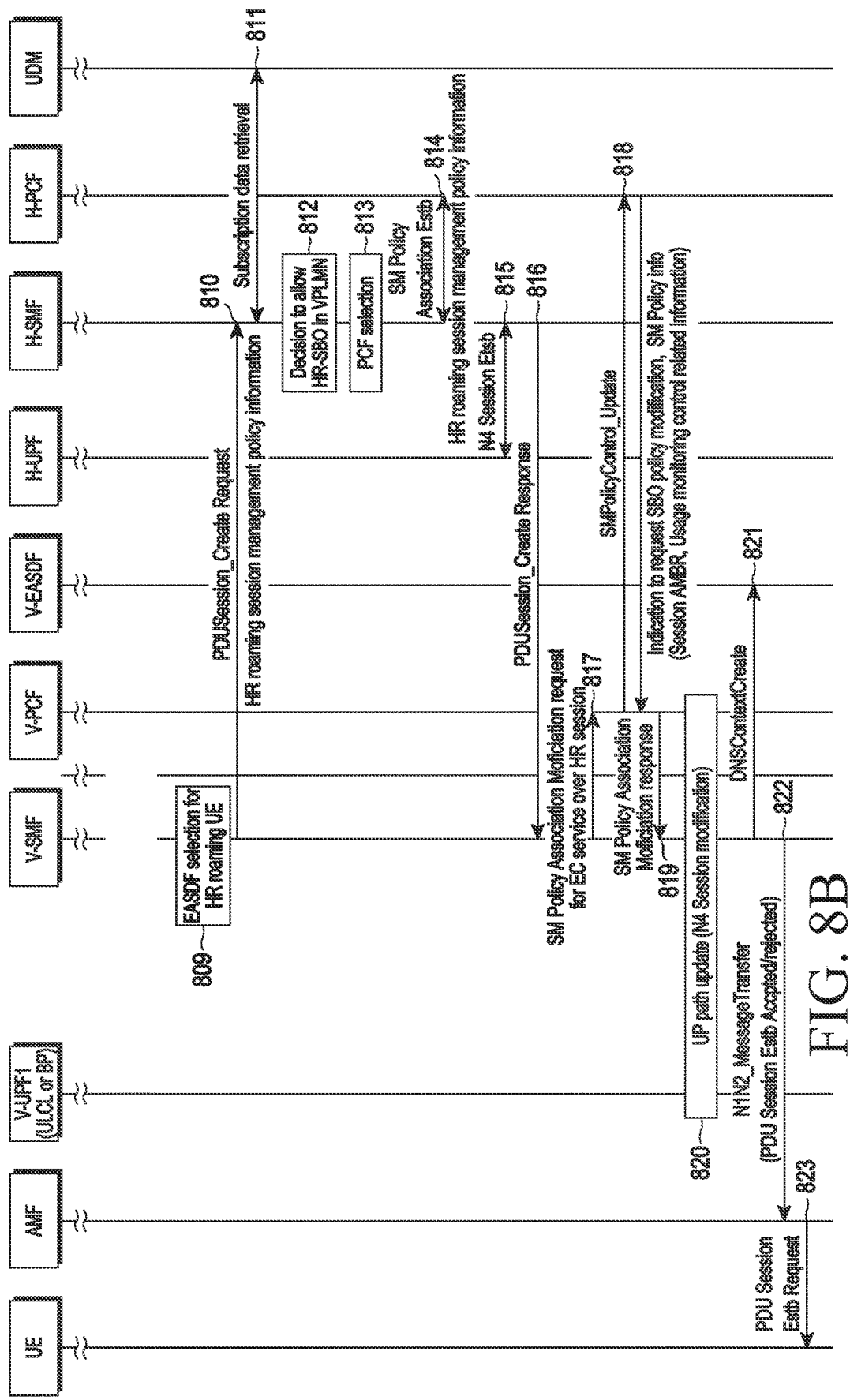

FIGS. 8A and 8B are diagrams illustrating a signal flow illustrating a procedure of creating and applying an SM policy in conjunction with an H-PCF by a V-PCF according to various embodiments of the disclosure. At least one of operations described below in the embodiments of the disclosure may be omitted, modified, or changed in order.

Referring to FIGS. 8A and 8B, operation 801 may be the same as operation 601 of FIG. 6A.

Operations 802a and 802b may be the same as operations 602a and 602b of FIG. 6A. In an embodiment of the disclosure, the AMF may not perform H-PCF discovery.

Operations 803a and 803b may be the same as operations 603a and 603b of FIG. 6A. In an embodiment of the disclosure, H-PCF information may not be transmitted to the V-SMF.

Operation 804 may be the same as operation 604 of FIG. 6A.

Operation 805 may be the same as operation 605 of FIG. 6A. In an embodiment of the disclosure, the H-PCF information may not be transmitted to the V-PCF.

Operation 806 may be the same as operation 606 of FIG. 6A.

In operation 807, the V-PCF may transmit a response message (e.g., an SM policy association establishment response message) to the SM policy association establishment request message to the V-SMF in operation 805. The response message may include policy information for the HR roaming session (e.g., "HR roaming session management policy information"). In an embodiment of the disclosure, the policy information may include at least one piece of the following information.

HR roaming SBO execution in VPLMN indication: To support the EC service, it may instruct a UP path configuration to connect to an LDN in the VPLMN by SBO of the HR roaming session.

SBO policy information and VPLMN ECS deployment information: It may include information indicating which traffic out of traffic of the HR roaming session is to be branched to which LDN. For example, a DNAI and a traffic descriptor for the EC service may be included.

Usage monitoring-related policy: It may indicate usage monitoring-related information (e.g., at least one of a usage threshold, a time threshold, or a monitoring period) for a session branched from the HR roaming session to the LDN of the VPLMN.

Session AMBR information for the HR roaming session: It may include at least one of the AMBR of a session branched from the HR roaming session to the LDN of the VPLMN and the AMBR of a session of the HR roaming session routed to an H-UPF (e.g., the H-UPF 104-1), or the total AMBR of the HR roaming session, or an allowed AMBR ratio of each of the session branched from the HR roaming session and the session of the HR roaming session routed to the HPLMN. In an embodiment of the disclosure, QoS information applied to the HR roaming session may further be included.

In operations 808a, 808b, and 808c, the V-SMF may select UPFs (e.g., V-UPF1, V-UPF2, V-UPF3) based on an HR roaming session-related management policy (e.g., including an SBO policy) provided from the V-PCF, establish connection with the selected UPFs, and configure UP paths for the UPFs, respectively.

In operation 809, the V-SMF may select a V-EASDF (e.g., V-EASDF 112-2) for the EC service of a roaming UE.

In operation 810, the V-SMF may transmit a PDU session creation request message (e.g., PDUSession_Create Request) to the H-SMF. The request message may provide SM policy information (e.g., "HR roaming session management policy information") applied for HR roaming SBO to the H-SMF. The SM policy information may include a VPLMN controlled policy decision result and policy information (e.g., UPF (V-UPF1) serving as a ULCL/BP), a PSA UPF (V-UPF2) and V-UPF3 through which the HR session passes) based on the result, and UPF information in the VPLMN (e.g., which may include at least one of V-UPF tunnel information, information for connection between the H-UPF and V-UPF3, for HR session connection, or information (e.g., a DNAI) related to the PSA UPF (V-UPF2) in the VPLMN that may indicate in which path the HR session is branched to an LDN). At least part of the information may be provided to the H-SMF in the form of an HR roaming SBO-related SM policy configuration report (e.g., "HR roaming SBO SM policy report").

In operation 811, the H-SMF may identify UE subscription information and roaming-related policy information stored in the UDM for the roaming UE (e.g., the UE 101) based on the information received from the V-SMF through the message of operation 810. The received information may include an indication requesting a HR roaming SBO-related policy requesting indication or an HR roaming session-related SM policy indication (e.g., "HPLMN controlled"). Through the identified information, the H-SMF may identify whether the EC service is allowed for the roaming UE, whether HR SBO in the VPLMN is available for the roaming UE, and/or whether an SM policy for the HR roaming session of the roaming UE is configurable under the control of the VPLMN.

In operation 812, the H-SMF may determine whether to allow HR SBO in the VPLMN is allowed based on the UE subscription information and the roaming-related policy information identified in operation 811. When the HR SBO in the VPLMN is allowed, the H-SMF may proceed to operation 813.

In operation 813, the H-SMF may select an H-PCF capable of providing a policy for the HR session. In an embodiment of the disclosure, the H-SMF may select an H-PCF corresponding to the H-PCF information from the V-SMF (e.g., a PCF interacting with the V-PCF, for policy configuration for the HR roaming session).

In operation 814, the H-SMF may perform an SM policy association establishment procedure with the selected H-PCF. During the SM policy association establishment procedure, the H-SMF may transmit, to the H-PCF, an indication requesting a policy for the HR roaming session and parameters (e.g., QoS information allowed in the VPLMN (e.g., session AMBR information) and/or usage monitoring information, such as a usage threshold) required for creation and configuration of an SM policy, received from the V-SMF, and receive policy information for the HR roaming session from the H-PCF.

The H-PCF may create an SM policy for the HR roaming session by identifying the information received from the H-SMF and the UE subscription information (e.g., roaming session management information out of SM-related subscription data and/or EC service-related information) about the roaming UE and roaming-related policy information stored in the UDM or the UDR, and transmit the created SM policy to the H-SMF. The SM policy may include a policy related to SBR of an HR roaming session, for application to UPFs (e.g., V-UPFs 1, 2 and 3) in the VPLMN as well as an H-UPF in the HPLMN. In an embodiment of the disclosure, the policy related to HR roaming SBO may include at least one piece of the following information.

HR roaming SBO execution in VPLMN indication: To support the EC service, it may instruct a UP path configuration to connect to an LDN in the VPLMN by SBO of the HR roaming session. Alternatively, it may be referred to as an HR roaming SBO allowed in VPLMN indication.

Usage monitoring-related policy (e.g., "usage monitoring control related information"): It may include at least one of information related to a threshold for a total usage of the HR roaming session, and/or usage monitoring information (e.g., a usage threshold, a time threshold, or a monitoring period) for each of a session branched from the HR roaming session to the LDN of the VPLMN and at least one session (i.e., the HR session) routed to the HPLMN.

Session AMBR information (e.g., "session AMBR") for the HR roaming session: It may include at least one of the AMBR of a session branched from the HR roaming session to the LDN of the VPLMN and the AMBR of a session of the HR roaming session routed to an H-UPF (e.g., the H-UPF 104-1), or the total AMBR of the HR roaming session, or an allowed AMBR ratio of each of the session branched from the HR roaming session and the session of the HR roaming session routed to the HPLMN. In an embodiment of the disclosure, QoS information applied to the HR roaming session may further be included.

In an embodiment of the disclosure, the H-PCF may provide an allowed indication indicating whether the SM policy for the SBO of the HR roaming session is allowed to be modified and applied in the VPLMN (e.g., by the V-PCF or the V-SMF) in operation 814. The allowed indication may indicate whether the V-SMF or the V-PCF is allowed to modify and apply an HR roaming SBO-related SM policy created by the H-PCF.

In operation 815, the H-SMF may select an H-UPF (e.g., the H-UPF 104-1) based on the SM policy received from the H-PCF, establish an N4 session connection, and provide information about a UPF in the VPLMN (information about to V-UPF3 to be connected to the H-UPF) to the H-UPF by an N4 session establishment message.

In operation 816, the H-SMF may transmit a response message (e.g., PDUSession_Create Response) corresponding to the request message of operation 810 to the V-SMF. The response message may include an EC service through HR SBO allowed indication and/or the HR roaming SBO-related SM policy created by the H-PCF in operation 815.

In operation 817, the V-SMF may transmit an SM policy association modification request message to the V-PCF, for authorization for the SM policy, without directly applying the received HR roaming SBO-related SM policy. The request message may include the H-PCF information received from the H-SMF in operation 816 and the HR roaming SBO-related policy information created by the H-PCF.

In operation 818, the V-PCF may identify the H-PCF information and the policy information received from the V-SMF, and transmit a request message (e.g., "SMPolicyControl_Update" or "SMPolicyControl_Create") for authorizing whether the SM policy based on the policy information is applicable in the VPLMN to the H-PCF. In an embodiment of the disclosure, when the SM policy needs modification (e.g., when the SM policy is not applicable in the VPLMN), the V-PCF may transmit the request message to the H-PCF, to modify the policy. The request message may include an indication requesting modification of the HR roaming SBO-related policy from the H-PCF, and information (e.g., a session AMBR and/or usage monitoring-related policy information) about an SM policy applicable to the VPLMN. The H-PCF may receive the request message from the V-PCF, and modify the previously created HR roaming SBO-related SM policy and provide the modified SM policy to the V-PCF, or reject the modification request of the V-PCF. In an embodiment of the disclosure, the H-PCF may transmit a response message including the modified HR roaming SBO-related SM policy or a response message including a modification request rejection in response to the request message.

In operation 819, the V-PCF may transmit the response message including the modified HR roaming SBO-related SM policy or the modification request rejection received from the H-PCF to the H-SMF.

In operation 820, the V-SMF may perform a UP path configuration update procedure (e.g., N4 session modification) for UPFs (e.g., V-UPF1 (ULCL or BP), V-UPF2 (PSA), and V-UPF3) based on the SM policy received from the V-PCF.

Operations 821, 822, and 823 may be the same as operations 718, 719, and 720 of FIGS. 7A and 7B.

Figure 9:
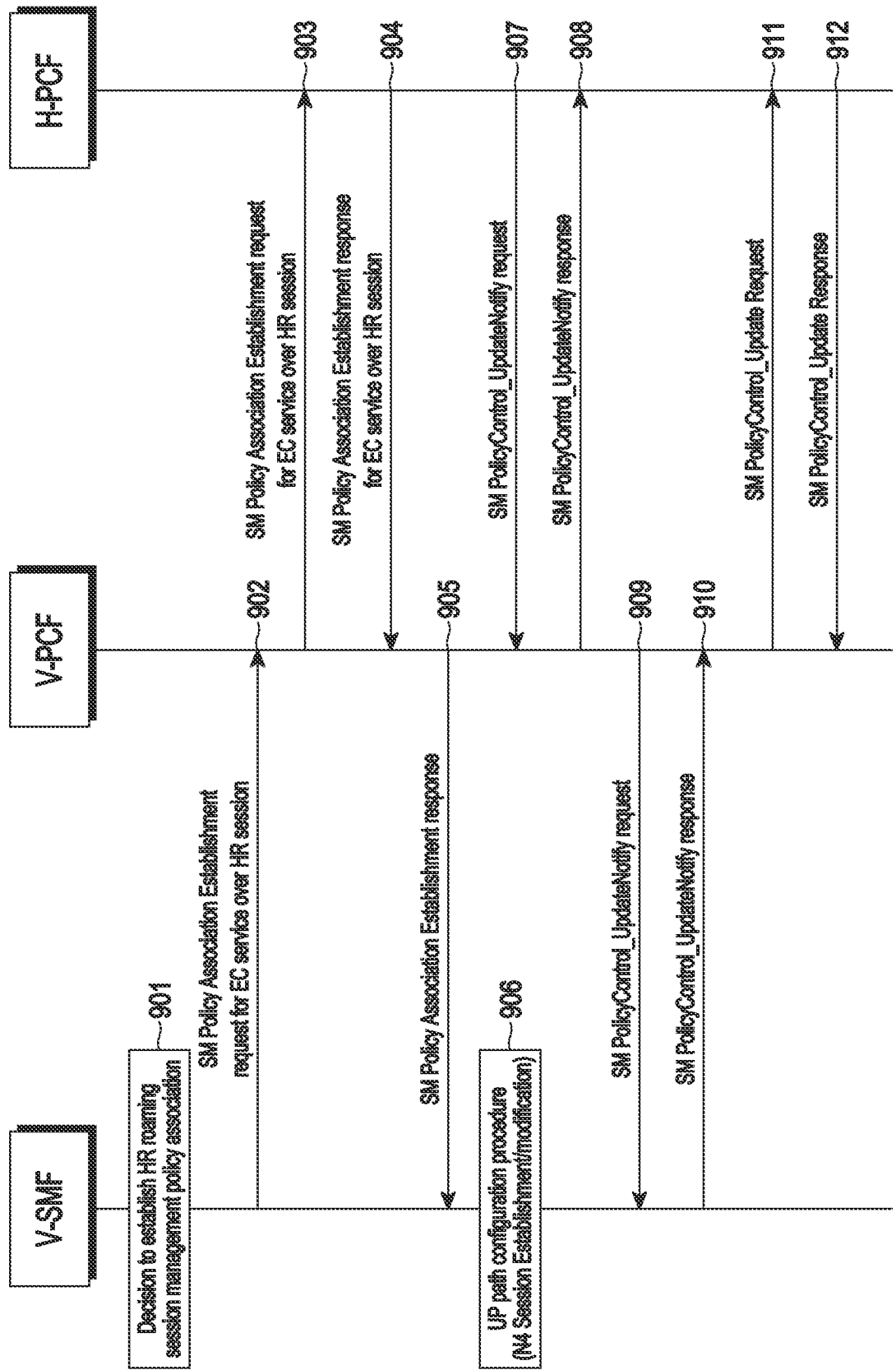
FIG. 9 is a diagram illustrating a signal flow for a procedure of creating and updating a policy related to session breakout of an HR roaming session according to an embodiment of the disclosure.

FIG. 9 is a diagram illustrating a signal flow for a procedure of creating and updating an HR roaming SBO-related policy according to an embodiment of the disclosure. At least one of the operations described below in embodiments of the disclosure may be omitted, modified, or changed in order.

Referring to FIG. 9, in operation 901, a V-SMF (e.g., the V-SMF 105-2) may determine to perform an SM policy association establishment procedure to create an SM policy for an HR roaming session. In an embodiment of the disclosure, upon receipt of a PDU session creation request message (e.g., "PDUSession_CreateSMContext Request") including an HR roaming SBO support indication or an HR roaming session-related SM policy indication from the AMF, the V-SMF may determine to perform the SM association establishment procedure. In an embodiment of the disclosure, the V-SMF may determine to perform the SM policy association establishment procedure based on an internal configuration or a VPLMN operator policy. In an embodiment of the disclosure, the HR roaming session-related SM policy indication received from the AMF may include a VPLMN controlled policy decision indication (e.g., "VPLMN controlled") or an HPLMN controlled policy decision indication (e.g., "HPLMN controlled").

In operation 902, the V-SMF may select a V-PCF (e.g., the V-PCF 106-2) and transmit an SM policy association establishment request message for requesting an EC service through an HR roaming session to the selected V-PCF. In an embodiment of the disclosure, the V-SMF may select a PCF capable of creating an SM policy for the HR roaming session as the V-PCF. The SM policy association establishment request message transmitted from the V-SMF to the V-PCF may include an indication requesting an HR roaming SBO-related SM policy (e.g., an "indication to request HR roaming SBO policy"), the HR roaming session-related SM policy indication received from the AMF, and/or H-PCF information (e.g., an ID and/or an address).

In operation 903, the V-PCF may transmit an SM policy association establishment request message to the H-PCF to create an SM policy, in response to the indication requesting the HR roaming SBO-related SM policy received from the V-SMF. In an embodiment of the disclosure, when the SM policy indication that the V-PCF has received from the V-SMF indicates HPLMN controlled policy decision (e.g., "HPLMN controlled"), the V-PCF may transmit the SM policy association establishment request message to the H-PCF. The SM policy association establishment request message may include policy information indicating an SM policy applicable in the VPLMN (e.g., QoS information, such as the AMBR of each of a session branched to an LDN of the VPLMN and a session routed to the HPLMN, and/or usage monitoring control information, such as a usage threshold) and an indication requesting an HR roaming SBO-related policy.

In operation 904, the H-PCF may create an SM policy to be applied to the HR roaming session (e.g., QoS information, such as the AMBR of each of a session branched to an LDN of the VPLMN and a session routed to the HPLMN, and/or usage monitoring control information, such as a usage threshold) in consideration of the information received from the V-PCF, UE subscription information for the roaming UE and roaming-related policy information stored in a UDR or a UDM), and transmit the created SM policy in an SM policy association establishment response message to the V-PCF. In an embodiment of the disclosure, the H-PCF may provide the V-PCF with an indication indicating whether modification of the created SM policy in the V-PCF is allowed, together with the SM policy.

In operation 905, the V-PCF may transmit policy information indicating the HR roaming session-related SM policy received from the H-PCF in an SM policy association establishment response message to the V-SMF. In an embodiment of the disclosure, the V-SMF may modify the SM policy received from the H-PCF and apply the modified SM policy.

In operation 906, the V-SMF may perform an N4 session establishment/modification procedure for configuring a UP path by applying the HR roaming SBO-related SM policy received from the V-PCF or the modified SM policy.

In operation 907, the H-PCF may transmit a request message (e.g., "SMPolicyControl_UpdateNotify request") for modifying the previously created SM policy or UP path to the V-PCF. The request message may include an SM policy for the HR roaming session, modified by the H-PCF. In an embodiment of the disclosure, when a monitored usage has reached a usage threshold or a spending limit indicating a usage limit of a policy counter, or according to a change in subscriber information, the H-PCF may trigger SM policy or UP path modification.

In operation 908, the V-PCF may transmit a response message (e.g., "SMPolicyControl_UpdateNotify Response") to the H-PCF in response to operation 906. The response message may include information indicating whether the modified SM policy is applicable.

In operation 909, the V-PCF may transmit the modified SM policy received from the H-PCF to the V-SMF, for example, by an SMPolicyControl_UpdateNotify Request message.

In operation 910, the V-SMF may transmit, to the V-PCF, a response message (e.g., SMPolicyControl_UpdateNotify Response) indicating successful reception of the modified SM policy received from the V-PCF and whether the modified SM policy is applicable.

In operation 911, the V-PCF may transmit a request message (e.g., "SMPolicyControl_Update Request") for modifying the HR roaming-related SM policy to the H-PCF according to a change in the network situation of the VPLMN. The request message may include information about an SM policy applicable to the HR roaming session in the VPLMN (e.g., QoS information, such as the AMBR of each of a session branched to an LDN of the VPLMN and a session routed to the HPLMN, and/or usage monitoring control information, such as a usage threshold).

In operation 912, the H-PCF may create a new HR roaming SBO-related SM policy in consideration of the information received from the V-PCF, and provide the new SM policy to the V-PCF, for example, by an SMPolicyControl_Update Response message.

Figure 10:
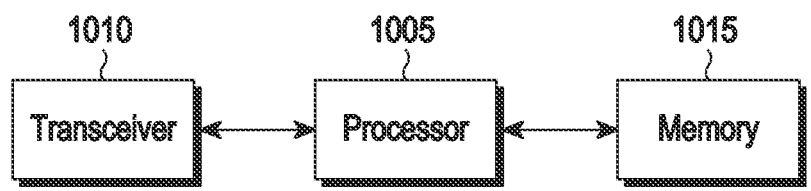
FIG. 10 is a block diagram illustrating a configuration of a user equipment (UE) according to an embodiment of the disclosure.

FIG. 10 is a block diagram illustrating a configuration of a UE according to an embodiment of the disclosure.

Referring to FIG. 10, a UE (e.g., the UE 101) may be implemented by including a processor 1005, a transceiver 1010, and a memory 1015, which may perform wireless communication according to a communication scheme specified by a wireless communication system according to the foregoing embodiments. In an embodiment of the disclosure, the processor 1005, the transceiver 1010, and the memory 1015 may be implemented in the form of at least one chip.

The processor 1005 may control the operation of the transceiver 1010, and provide overall control to the components of the UE 101 such that a PDU session is established by using a program (e.g., the AC 102 and the EEC) installed and/or stored in the memory 1015 in each of the embodiments of FIGS. 5A, 5B, 6A, 6B, 7A, 7B, 8A, 8B, and 9 or a combination of at least two of the embodiments of the disclosure, and communication is performed with one or more network nodes.

Figure 11:
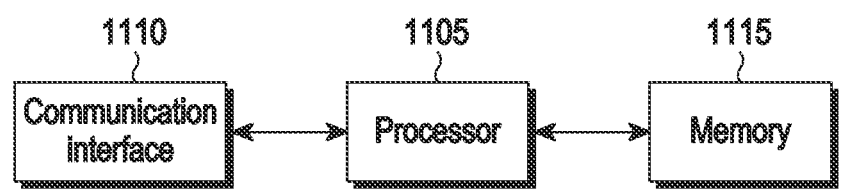
FIG. 11 is a block diagram illustrating a configuration of a network entity according to an embodiment of the disclosure.

FIG. 11 is a block diagram illustrating a configuration of a network entity according to an embodiment of the disclosure.

Referring to FIG. 11, a network entity may be implemented by including a processor 1105, a communication interface 1110, and a memory 1115, which may perform wired/wireless communication according to a specified communication scheme according to the foregoing embodiments.

The processor 1105 may control the operation of the communication interface 1110, and provide overall control to the components of the network entity such that a roaming UE (e.g., the UE 101) may use an EC service in a visited network in each of the embodiments of FIGS. 5A, 5B, 6A, 6B, 7A, 7B, 8A, 8B, and 9 or a combination of at least two of the embodiments.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method performed by a visited session management function (V-SMF) supporting an edge computing service for a roaming user equipment (UE) in a wireless communication system, the method comprising:
   receiving a first request message for protocol data unit (PDU) session establishment of the roaming UE from an access and mobility management function (AMF), wherein the first request message includes:
      a first indication indicating that session breakout (SBO) of a home routed (HR) roaming session in a visited network is supportable, and
      a session management policy indication for supporting the edge computing service through HR roaming;
   selecting a visited policy control function (V-PCF) providing an SBO policy for supporting the edge computing service for the HR roaming session according to the first request message; and
   transmitting a second request message requesting the edge computing service through the HR roaming session to the V-PCF, wherein the second request message includes an indication requesting an SBO policy for the HR roaming session.

2. The method of claim 1, further comprising:
   receiving a response message including the SBO policy for the HR roaming session from the V-PCF; and
   configuring user plane (UP) paths in a plurality of user plane functions (UPFs) related to the HR roaming session based on the SBO policy.

3. The method of claim 1, further comprising:
   transmitting a third request message including session management policy information applied for SBO of the HR roaming session to a home SMF (H-SMF) of the roaming UE.

4. The method of claim 3, wherein the third request message includes a result of configuring the SBO policy, policy information corresponding to the plurality of UPFs, and UPF information indicating the plurality of UPFs.

5. The method of claim 1, further comprising:
   transmitting a message including a domain name service (DNS) message handling rule and a home DNS server address for the HR roaming session to a visited edge application server discovery function (V-EASDF) for the edge computing service of the roaming UE.

6. The method of claim 1, further comprising:
   transmitting a PDU session creation result for the HR roaming session and the home DNS server address to the roaming UE through the AMF.

7. A method performed by a visited policy control function (V-PCF) supporting an edge computing service for a roaming user equipment (UE) in a wireless communication system, the method comprising:
   receiving a first request message requesting the edge computing service through a home routed (HR) roaming session of the roaming UE from a visited session management function (V-SMF), wherein the first request message includes an indication requesting a session outbreak (SBO) policy for the HR roaming session;
   when the indication indicates visited network controlled policy decision, determining to create the SBO policy in a visited network; and
   transmitting a response message including the SBO policy created by the V-PCF to the V-SMF.

8. The method of claim 7, further comprising:
   when the indication indicates home network controlled policy decision, determining to create the SBO policy in conjunction with a home policy control function (H-PCF); and
   transmitting a second request message requesting creation of a session management policy for the HR roaming session to the H-PCF.

9. The method of claim 8, wherein the second request message includes an indication requesting an SBO policy for the HR roaming session and information about a V-SMF managing the HR roaming session.

10. The method of claim 7, further comprising:
    receiving a session management policy including the SBO policy for the HR roaming session from the H-PCF; and
    transmitting the session management policy to the V-SMF.

11. A visited session management function (V-SMF) supporting an edge computing service for a roaming user equipment (UE) in a wireless communication system, the V-SMF comprising:
    a communication interface; and
    at least one processor coupled to the communication interface,
    wherein the at least one processor is configured to:
       receive a first request message for protocol data unit (PDU) session establishment of the roaming UE from an access and mobility management function (AMF), wherein the first request message includes:
          a first indication indicating that session breakout (SBO) of a home routed (HR) roaming session in a visited network is supportable, and
          a session management policy indication for supporting the edge computing service through HR roaming,
       select a visited policy control function (V-PCF) providing an SBO policy for supporting the edge computing service for the HR roaming session according to the first request message, and transmit a second request message requesting the edge computing service through the HR roaming session to the V-PCF, wherein the second request message includes an indication requesting an SBO policy for the HR roaming session.

12. The V-SMF of claim 11, wherein the at least one processor is further configured to:

receive a response message including the SBO policy for the HR roaming session from the V-PCF, and configure user plane (UP) paths in a plurality of user plane functions (UPFs) related to the HR roaming session based on the SBO policy.

13. The V-SMF of claim 11, wherein the at least one processor is further configured to transmit a third request message including session management policy information applied for SBO of the HR roaming session to a home SMF (H-SMF) of the roaming UE.

14. The V-SMF of claim 13, wherein the third request message includes a result of configuring the SBO policy, policy information corresponding to the plurality of UPFs, and UPF information indicating the plurality of UPFs.

15. The V-SMF of claim 11, wherein the at least one processor is further configured to transmit a message including a domain name service (DNS) message handling rule and a home DNS server address for the HR roaming session to a visited edge application server discovery function (V-EASDF) for the edge computing service of the roaming UE.

16. The V-SMF of claim 11, wherein the at least one processor is further configured to transmit a PDU session creation result for the HR roaming session and the home DNS server address to the roaming UE through the AMF.

17. A visited policy control function (V-PCF) supporting an edge computing service for a roaming user equipment (UE) in a wireless communication system, the V-PCF comprising:

a communication interface; and at least one processor coupled to the communication interface, wherein the at least one processor is configured to:

receive a first request message requesting the edge computing service through a home routed (HR) roaming session of the roaming UE from a visited session management function (V-SMF), wherein the first request message includes an indication requesting a session outbreak (SBO) policy for the HR roaming session, when the indication indicates visited network controlled policy decision, determine to create the SBO policy in a visited network, and transmit a response message including the SBO policy created by the V-PCF to the V-SMF.

18. The V-PCF of claim 17, wherein the at least one processor is further configured to:

when the indication indicates home network controlled policy decision, determine to create the SBO policy in conjunction with a home policy control function (H-PCF), transmit a second request message requesting creation of a session management policy for the HR roaming session to the H-PCF.

19. The V-PCF of claim 18, wherein the second request message includes an indication requesting an SBO policy for the HR roaming session and information about a V-SMF managing the HR roaming session.

20. The V-PCF of claim 17, wherein the at least one processor is further configured to:

receive a session management policy including the SBO policy for the HR roaming session from the H-PCF, and transmit the session management policy to the V-SMF.

\* \* \* \* \*